(12) United States Patent
Kravets et al.

(10) Patent No.: US 10,605,908 B2
(45) Date of Patent: *Mar. 31, 2020

(54) MOTION DETECTION BASED ON BEAMFORMING DYNAMIC INFORMATION FROM WIRELESS STANDARD CLIENT DEVICES

(71) Applicant: Cognitive Systems Corp., Waterloo (CA)

(72) Inventors: Oleksiy Kravets, Petersburg (CA); Mohammad Omer, Waterloo (CA); Stanley Ituah, Waterloo (CA); Karanvir Chattha, Waterloo (CA); Tajinder Manku, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,729

(22) Filed: Nov. 8, 2018

(65) Prior Publication Data

US 2019/0146077 A1    May 16, 2019

Related U.S. Application Data

(60) Provisional application No. 62/586,824, filed on Nov. 15, 2017, provisional application No. 62/633,789, (Continued)

(51) Int. Cl.
*G01S 13/56* (2006.01)
*G01S 13/00* (2006.01)
(Continued)

(52) U.S. Cl.
CPC ............ *G01S 13/56* (2013.01); *G01S 13/003* (2013.01); *G01S 13/42* (2013.01); *H04B 17/391* (2015.01)

(58) Field of Classification Search
CPC ....... H04B 1/3816; H04B 13/02; G01S 13/56; G01S 13/003; G01S 13/52; G01S 13/58;
(Continued)

(56) References Cited

U.S. PATENT DOCUMENTS 4,054,879 A   10/1977   Wright et al.
4,649,388 A    3/1987   Atlas
(Continued)

FOREIGN PATENT DOCUMENTS

CA        2834522       5/2014
WO     2014/201574    12/2014
(Continued)

OTHER PUBLICATIONS

WIPO, International Search Report and Written Opinion dated Feb. 28, 2019, in PCT/CA2018/051446, 10 pgs.
(Continued)

*Primary Examiner* — Ajibola A Akinyemi
(74) *Attorney, Agent, or Firm* — Henry Patent Law Firm PLLC

(57) ABSTRACT

In a general aspect, motion is detected using wireless signals. In one example, a wireless standard protocol message is transmitted by a wireless communication device through a space to one or more neighbor devices. A corresponding wireless standard protocol response including beamforming information feedback is received from each of the one or more neighbor devices in response to the wireless standard protocol message. Motion of an object in the space is detected based on the beamforming information feedback from each of the neighbor devices.

29 Claims, 20 Drawing Sheets

Related U.S. Application Data filed on Feb. 22, 2018, provisional application No. 62/648,110, filed on Mar. 26, 2018.

(51) Int. Cl.
  *H04B 17/391* (2015.01)
  *G01S 13/42* (2006.01)

(58) Field of Classification Search
  CPC . G01S 13/88; G01S 13/931; G01S 2013/9332
  USPC ...................................................... 455/67.11
  See application file for complete search history.

(56) References Cited

U.S. PATENT DOCUMENTS

| | | | |
|---|---|---|---|
| 4,740,045 | A | 4/1988 | Goodson et al. |
| 5,270,720 | A | 12/1993 | Stove |
| 5,696,514 | A | 12/1997 | Nathanson et al. |
| 6,075,797 | A | 6/2000 | Thomas |
| 6,573,861 | B1 | 6/2003 | Hommel et al. |
| 6,914,854 | B1 | 7/2005 | Heberley et al. |
| 7,652,617 | B2 | 1/2010 | Kurtz et al. |
| 8,463,191 | B2 | 6/2013 | Farajidana et al. |
| 8,660,578 | B1 | 2/2014 | Yang et al. |
| 8,812,654 | B2 | 8/2014 | Gelvin et al. |
| 8,832,244 | B2 | 9/2014 | Gelvin et al. |
| 8,836,503 | B2 | 9/2014 | Gelvin et al. |
| 9,019,148 | B1 | 4/2015 | Bikhazi et al. |
| 9,030,321 | B2 | 5/2015 | Breed |
| 9,253,592 | B1 | 2/2016 | Moscovich et al. |
| 9,523,760 | B1 | 12/2016 | Kravets et al. |
| 9,524,628 | B1 | 12/2016 | Omer et al. |
| 9,584,974 | B1 | 2/2017 | Omer et al. |
| 9,609,468 | B1 | 3/2017 | Moscovich et al. |
| 9,628,365 | B2 | 4/2017 | Gelvin et al. |
| 9,692,459 | B2 | 6/2017 | Maltsev et al. |
| 9,743,294 | B1 | 8/2017 | Omer et al. |
| 9,866,308 | B1 | 1/2018 | Bultan et al. |
| 9,927,519 | B1 | 3/2018 | Omer et al. |
| 9,933,517 | B1 | 4/2018 | Olekas et al. |
| 9,989,622 | B1 | 6/2018 | Griesdorf et al. |
| 10,004,076 | B1 | 6/2018 | Griesdorf et al. |
| 10,077,204 | B2 | 9/2018 | Maschmeyer et al. |
| 10,459,076 | B2 | 10/2019 | Kravets et al. |
| 2003/0108119 | A1 | 6/2003 | Mohebbi et al. |
| 2007/0296571 | A1 | 12/2007 | Kolen |
| 2008/0057978 | A1* | 3/2008 | Karaoguz ............. H04W 48/16 455/456.3 |
| 2008/0119130 | A1 | 5/2008 | Sinha |
| 2008/0240008 | A1 | 10/2008 | Backes et al. |
| 2008/0303655 | A1 | 12/2008 | Johnson |
| 2009/0062696 | A1 | 3/2009 | Nathan et al. |
| 2009/0180444 | A1* | 7/2009 | McManus ............. H04W 36/30 370/332 |
| 2010/0130229 | A1 | 5/2010 | Sridhara et al. |
| 2010/0315284 | A1 | 12/2010 | Trizna et al. |
| 2011/0035491 | A1 | 2/2011 | Gelvin et al. |
| 2012/0115512 | A1 | 5/2012 | Grainger et al. |
| 2012/0146788 | A1 | 6/2012 | Wilson et al. |
| 2012/0182429 | A1 | 7/2012 | Forutanpour et al. |
| 2013/0017836 | A1 | 1/2013 | Chang et al. |
| 2013/0113647 | A1 | 5/2013 | Sentelle et al. |
| 2013/0162459 | A1 | 6/2013 | Aharony et al. |
| 2013/0283256 | A1 | 10/2013 | Proud |
| 2014/0126323 | A1 | 5/2014 | Li et al. |
| 2014/0135042 | A1 | 5/2014 | Buchheim et al. |
| 2014/0213284 | A1 | 7/2014 | Yang et al. |
| 2014/0247179 | A1 | 9/2014 | Furuskog |
| 2014/0286380 | A1 | 9/2014 | Prager et al. |
| 2014/0355713 | A1* | 12/2014 | Bao ..................... H04B 7/0456 375/295 |
| 2015/0043377 | A1 | 2/2015 | Cholas et al. |
| 2015/0063323 | A1 | 3/2015 | Sadek et al. |
| 2015/0078295 | A1 | 3/2015 | Mandyam et al. |
| 2015/0098377 | A1 | 4/2015 | Amini et al. |
| 2015/0159100 | A1 | 6/2015 | Shi et al. |
| 2015/0181388 | A1 | 6/2015 | Smith |
| 2015/0195100 | A1 | 7/2015 | Imes et al. |
| 2015/0245164 | A1 | 8/2015 | Merrill |
| 2015/0338507 | A1 | 11/2015 | Oh et al. |
| 2015/0366542 | A1 | 12/2015 | Brown et al. |
| 2016/0018508 | A1 | 1/2016 | Chen et al. |
| 2016/0150418 | A1 | 5/2016 | Kang et al. |
| 2016/0183059 | A1 | 6/2016 | Nagy et al. |
| 2016/0187475 | A1 | 6/2016 | Horng et al. |
| 2016/0210838 | A1 | 7/2016 | Yan et al. |
| 2017/0042488 | A1 | 2/2017 | Muhsin |
| 2017/0086281 | A1 | 3/2017 | Avrahamy |
| 2017/0126488 | A1* | 5/2017 | Cordeiro ................. H04W 4/21 |
| 2017/0146656 | A1 | 5/2017 | Belsley et al. |
| 2017/0150255 | A1 | 5/2017 | Wang et al. |
| 2017/0155439 | A1 | 6/2017 | Chang et al. |
| 2017/0180882 | A1 | 6/2017 | Lunner et al. |
| 2017/0223628 | A1 | 8/2017 | Snyder et al. |
| 2017/0278374 | A1 | 9/2017 | Skaaksrud |
| 2017/0280351 | A1 | 9/2017 | Skaaksrud |
| 2017/0311279 | A1 | 10/2017 | Allegue Martinez et al. |
| 2017/0343658 | A1 | 11/2017 | Ramirez et al. |
| 2018/0086264 | A1 | 3/2018 | Pedersen |
| 2018/0168552 | A1 | 6/2018 | Shi et al. |
| 2019/0033446 | A1 | 1/2019 | Bultan et al. |
| 2019/0146076 | A1 | 5/2019 | Kravets et al. |

FOREIGN PATENT DOCUMENTS

| | | |
|---|---|---|
| WO | 2015/168700 | 11/2015 |
| WO | 2016005977 | 1/2016 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017177303 | 10/2017 |
| WO | 2017/210770 | 12/2017 |
| WO | 2018/094502 | 5/2018 |

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

"802.11ac Transmit Beamforming and VHT NDP sounding procedure", Cisco Support Community; https://supportforums.cisco.com/t5/wireless-mobility-blogs/802-11ac-transmit-beamforming-and-vht-ndp-sounding-procedure/ba-p/3106204, May 20, 2015, 5 pgs.

"802.11 ac: A Survival Guide, Chapter 4. Beamforming in 802.11ac", http://chimera.labs.oreilly.com/books/1234000001739/ch04.html, 2013, 23 pgs.

"Part 11: Wireless LAN Medium Access Control (MAC) and Physical Layer (PHY) Specifications", IEEE Std 802.11ac-2013; IEEE, 3 Park Ave., New York, NY 10016-5997, Dec. 11, 2013, 425.

WIPO, International Search Report and Written Opinion dated Jan. 22, 2019, in PCT/CA2018/051447, 10 pgs.

USPTO, Non-Final Office Action dated Jan. 22, 2019, in U.S. Appl. No. 16/184,685, 18 pgs.

USPTO, Non-Final Office Action dated Jan. 14, 2019, in U.S. Appl. No. 16/184,724, 26 pgs.

WIPO, International Search Report and Written Opinion dated Feb. 19, 2019, in PCT/CA2018/051445, 9 pgs.

USPTO, Notice of Allowance dated Aug. 19, 2019, in U.S. Appl. No. 16/184,685, 15 pgs.

USPTO, Final Office Action dated Jul. 25, 2019, in U.S. Appl. No. 16/184,724, 34 pgs.

(56) References Cited

OTHER PUBLICATIONS

USPTO, Notice of Allowance dated Nov. 6, 2019, in U.S. Appl. No. 16/184,724, 14 pgs.

* cited by examiner

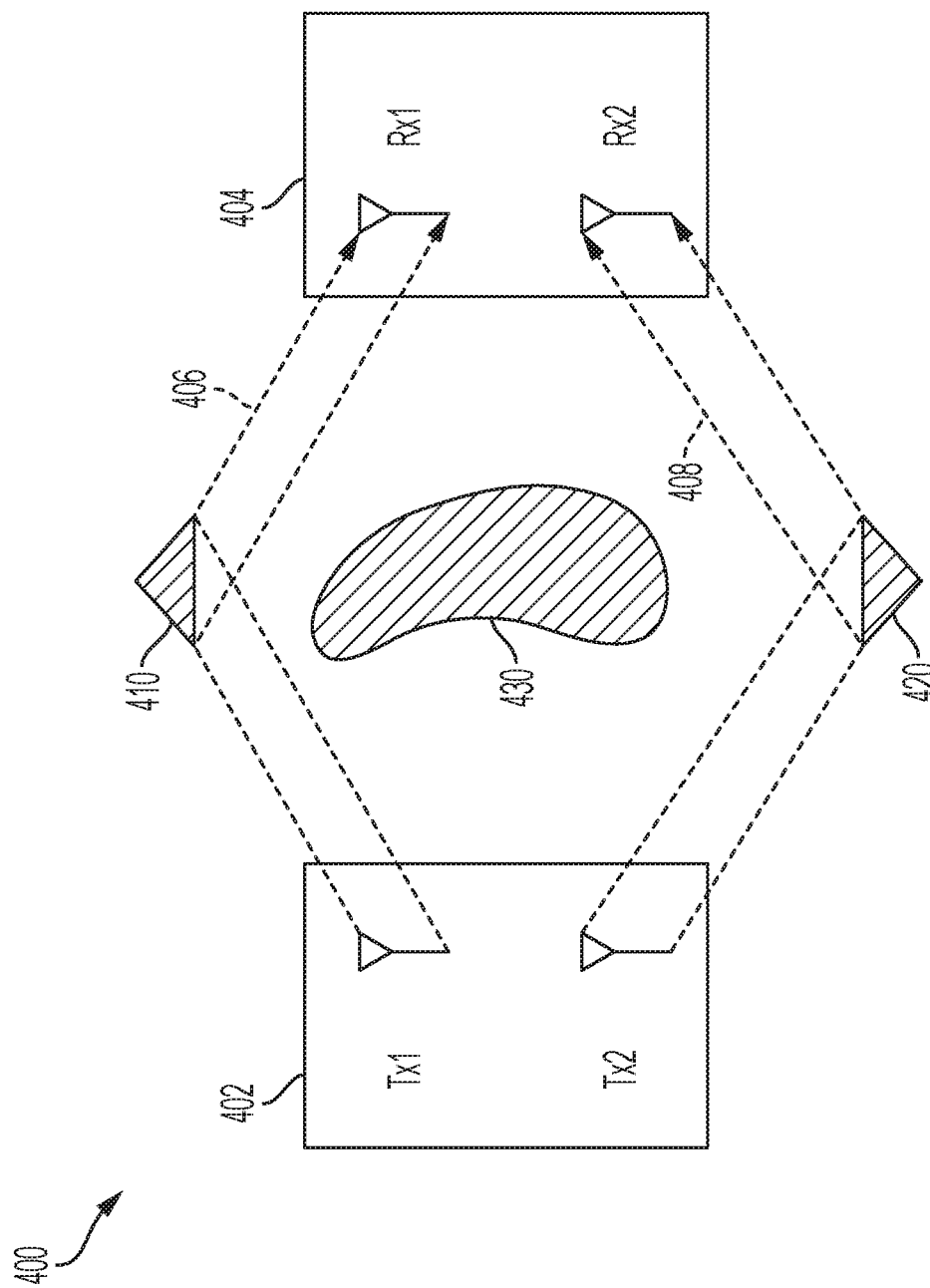

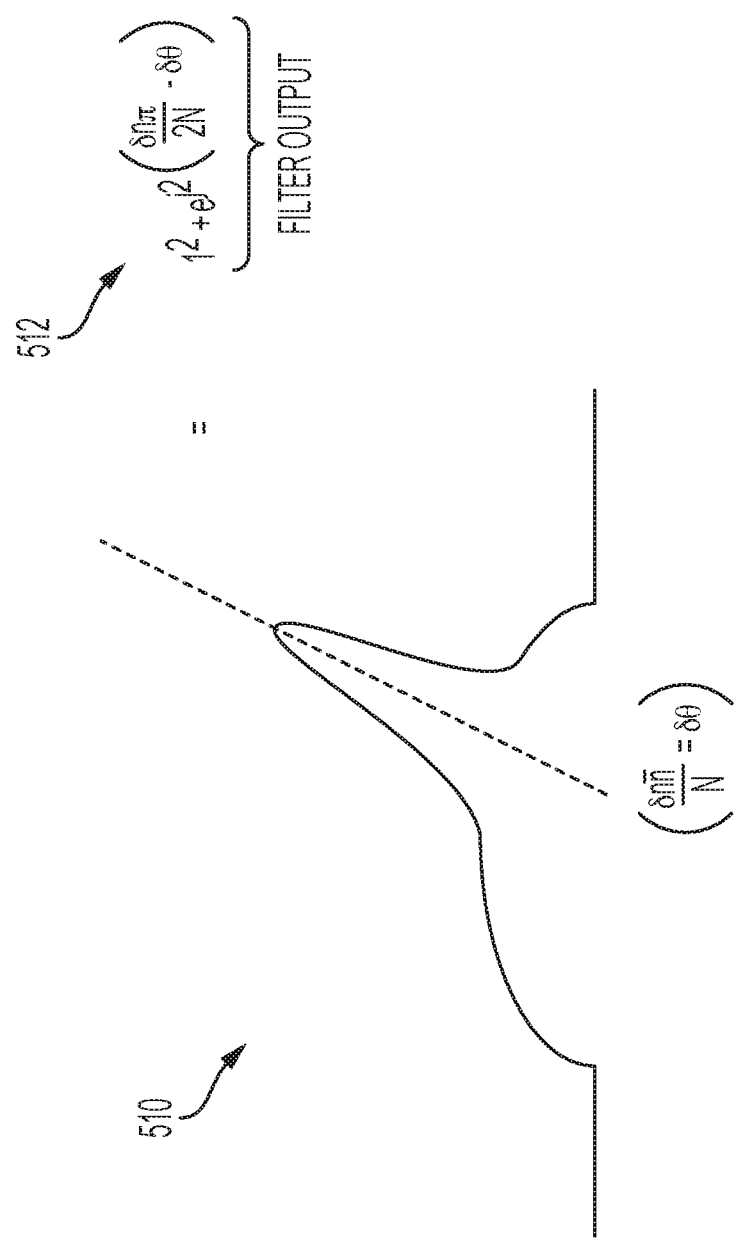

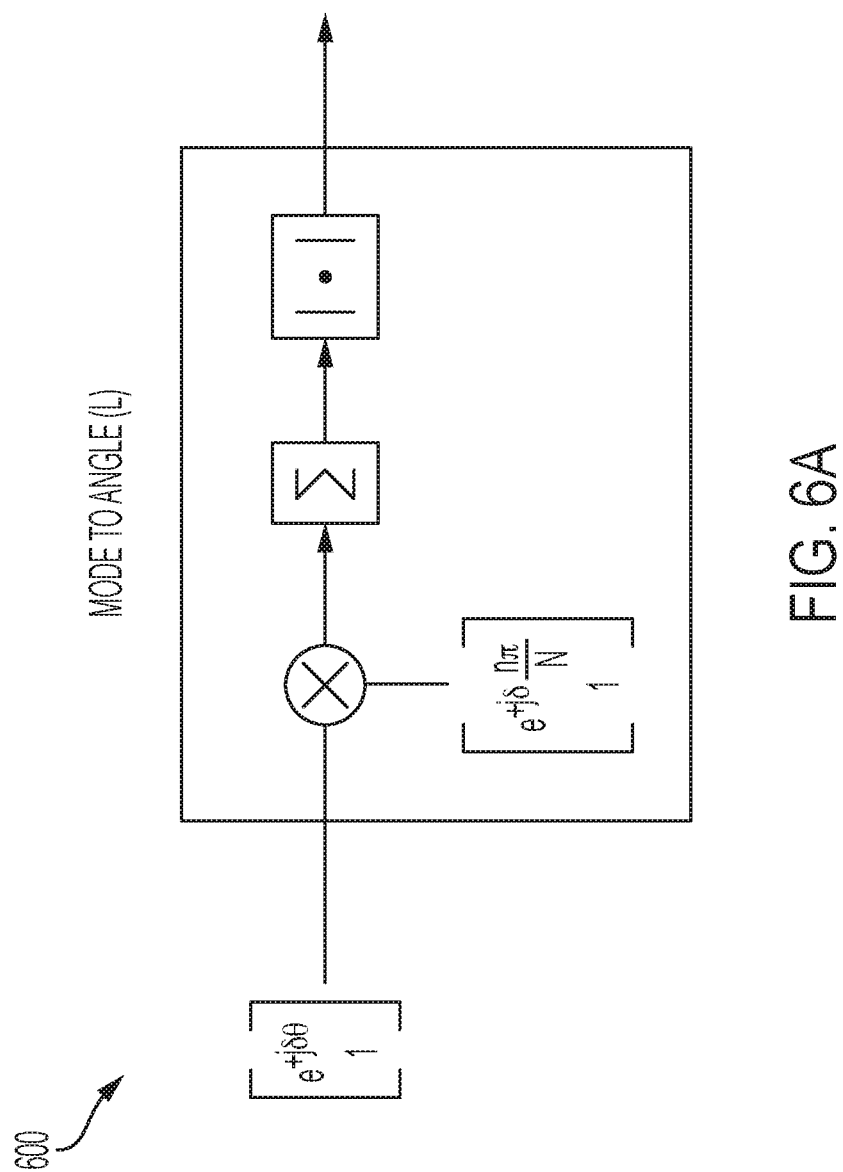

US 10,605,908 B2

MOTION DETECTION BASED ON BEAMFORMING DYNAMIC INFORMATION FROM WIRELESS STANDARD CLIENT DEVICES

CROSS-REFERENCE TO RELATED APPLICATIONS

This application claims priority to U.S. Provisional Application No. 62/586,824 entitled "Motion Detection Based on Beamforming Dynamic Information" and filed Nov. 15, 2017, U.S. Provisional Application No. 62/633,789 entitled "Motion Detections Using a Central Computing Node" and filed Feb. 22, 2018, and U.S. Provisional Application No. 62/648,110 entitled "Motion Detection Based on Beamforming Dynamic Information" and filed Mar. 26, 2018, all of which are hereby incorporated by reference.

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 4A-4B are diagrams showing an example wireless communication system that includes objects in a space between a transmitter and a receiver.

FIGS. 5A-5B are diagrams showing an example spatial map generation process for a first mode of a motion detection system.

FIGS. 6A, 6B, 6C are diagrams showing an example spatial map generation processes for a motion detection system.

DETAILED DESCRIPTION

Figure 1:
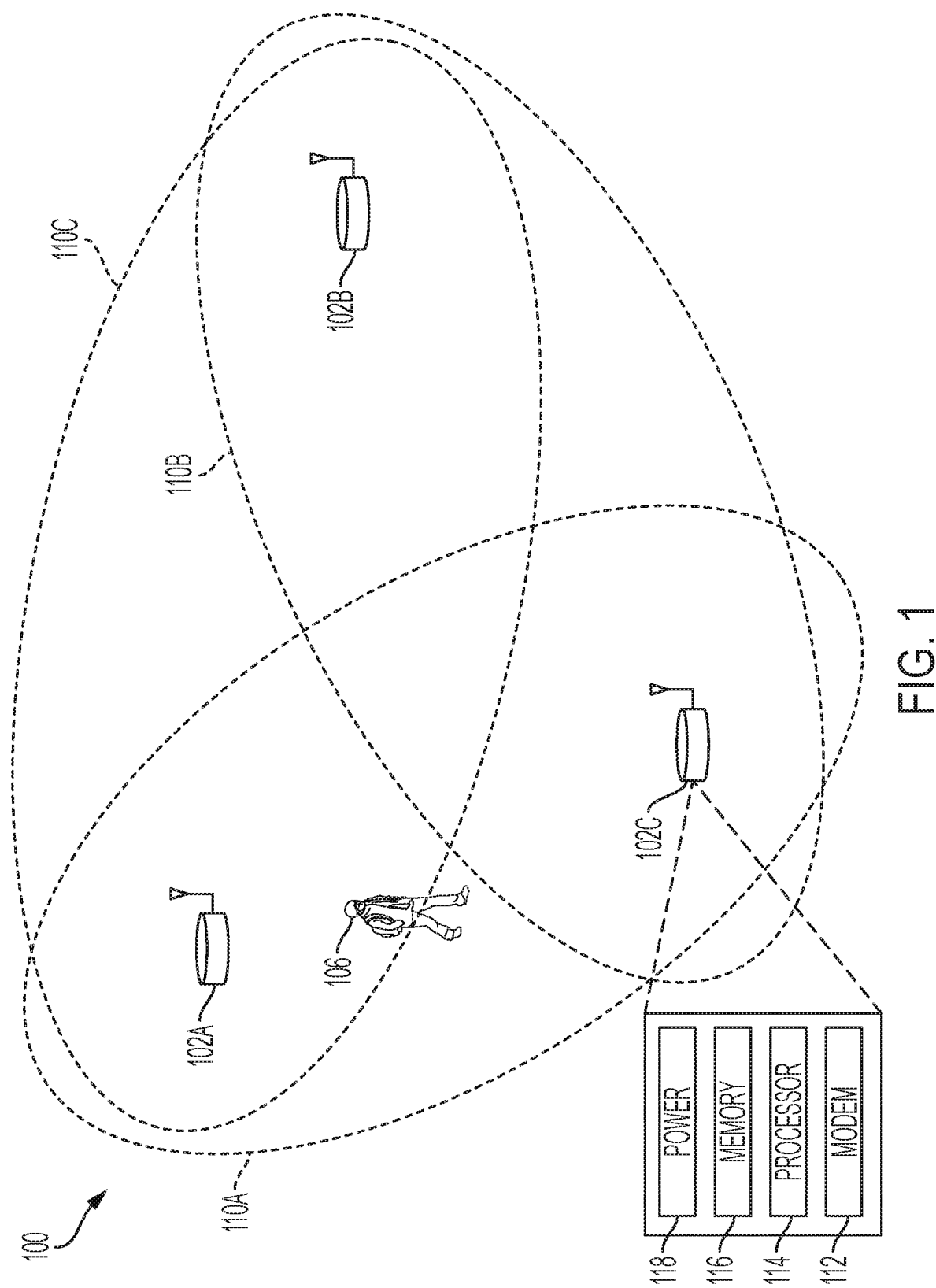
FIG. 1 is a diagram showing an example wireless communication system.

In some aspects of what is described, motion in a space is detected based on beamforming dynamic information. Beamforming dynamic information may refer to the behavior of, or information generated or used by, wireless communication devices in performing beamforming operations over time. For example, beamforming dynamic information may include feedback or steering matrices generated by wireless communication devices communicating according to an IEEE 802.11 standard (e.g., the IEEE 802.11-2012 standard or the IEEE 802.11ac-2013 standard, which are both hereby incorporated by reference). By analyzing changes in the beamforming dynamic information of wireless communication devices, motion in the space may be detected. For example, in some implementations, feedback and steering matrices generated by wireless communication devices in a beamforming wireless communication system may be analyzed over time to detect changes in the channel state (which may be caused by motion of an object). Beamforming may be performed between devices based on some knowledge of the channel state (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes in the channel state, which may be caused by moving objects in the space accessed by the wireless communication system.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

Channel sounding may refer to the process performed to acquire Channel State Information (CSI) from each of the different receiver devices in a wireless communication system. In some instances, channel sounding is performed by sending training symbols (e.g., a null data packet (NDP) as specified in in the IEEE 802.11ac-2013 standard) and waiting for the receiver devices to provide feedback that includes a measure of the channel. In some instances, the feedback includes a feedback matrix calculated by each of the receiver devices. This feedback may then be used to generate the steering matrix used to pre-code the data transmission by creating a set of steered beams, which may optimize reception at one or more receiver devices. The channel sounding process may be performed repeatedly by a wireless communication system. The steering matrix will therefore repeatedly update, such as, for example, to minimize the impact of the propagation channel change to the data transmission quality. By observing changes in the steering matrix (or feedback matrix) over time, motion by an object in the channel can be detected. Further, in some cases, different categories of motion (e.g., human motion vs. dog/cat motion) can be identified.

Changes in the beamforming or feedback matrices can be analyzed to detect motion in a number of ways. In some cases, for example, a variance for each entry in the matrix is analyzed, or the linear independence of matrix columns (e.g., rank) may be analyzed. This information can, for example, allow for determining a number of independently fading paths present in the channel. In some cases, if the coefficients of this linear independence are changing, the changes could be due to a moving object restricted to a certain zone. If the number of linearly independent columns itself changes, the changes could be due to wide-spread changes across the channel, allowing different kinds of multipath to be created and destroyed. In some cases, the time series of this inter-column correlation can be analyzed to determine, for example, how slow or fast these changes are occurring.

In some instances, the beamforming is performed according to a standardized process. For example, the beamforming may be performed according to an IEEE 802.11 standard (e.g., 802.11g, 802.11n, or 802.11ac standards). The beamforming may be an optional or mandatory feature of the standard. Beamforming may be performed according to another standard, or in another manner. In some cases, the 802.11 standard applies adaptive beamforming using multi-antenna spatial diversity to improve data transmission quality between network nodes. Moving objects change spatial characteristics of the environment by changing multipath propagation of transmitted wireless signals. As a result, such movement can influence a beamforming steering configuration performed by a device according to the 802.11 standard. By observing how the spatial configuration (e.g., beamforming) of the beamformer changes over time (e.g., via the steering matrix generated by the beamformer based on a feedback matrix), physical motion within the area covered by wireless transmission may be detected.

The systems and techniques described here may provide one or more advantages in some instances. For example, motion may be detected using wireless signals transmitted through a space using two or more wireless communication devices. In addition, motion may be detected according to known protocols or processes (e.g., aspects of the IEEE 802.11 standard) already being implemented on wireless communication devices.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional or fewer (e.g., two) wireless communication devices and may include other components (e.g., additional wireless communication devices, one or more network servers, network routers, network switches, cables, or other communication links, etc.). In some instances, the wireless communication devices 102 perform beamforming operations to increase network efficiency (e.g., through higher SNR) or for other purposes.

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, the wireless mesh network operates according to an IEEE 802.11 mesh standard protocol (e.g., 802.11s). In other cases, the wireless communication devices 102A, 102B, 102C may form a star or an ad-hoc network. These networks, e.g. mesh, star, or ad-hoc, may form a motion sensing network. In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system. In some implementations, wireless communication devices 102A, 102B, 102C may be a user equipment (UE), mobile phone, smart phone, tablet, computer, PDA, Internet of Things (IoT) device, smart device, wearable device, or any device capable of wireless communication.

As shown in FIG. 1, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1 or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). The modem 112 may be implemented as the example transmitter 212 or receiver 222 shown in FIG. 2B, or the modem 112 may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the example modem 112 can communicate wireless network traffic (e.g., data packets) on the wireless communication network through the radio subsystem on one or more wireless communication channels. For example, in some implementations, a first modem of a first wireless communication device can communicate a null data packet (NDP) on the wireless communication network. A second modem of a second wireless communication device can receive the NDP and generate a feedback matrix based on the NDP, which can be communicated back to the first modem for use in the determination of a steering matrix, which may be used to steer or beamform wireless network traffic sent on the one or more wireless communication channels. Other types of data packets may be used in a similar manner.

The example processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. The processor 114 may be or include a general-purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for detecting motion, such as through one or more of the operations of the example process 900 of FIG. 9, the example process 1000 of FIG. 10, or the example process 1100 of FIG. 11.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless signals (e.g., reference signals, beacon signals, status signals, etc.), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example processes described below with respect to FIGS. 3-11, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In the example shown in FIG. 1, the wireless communication system 100 is a wireless mesh network, with wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1 moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device.

Figure 2A:
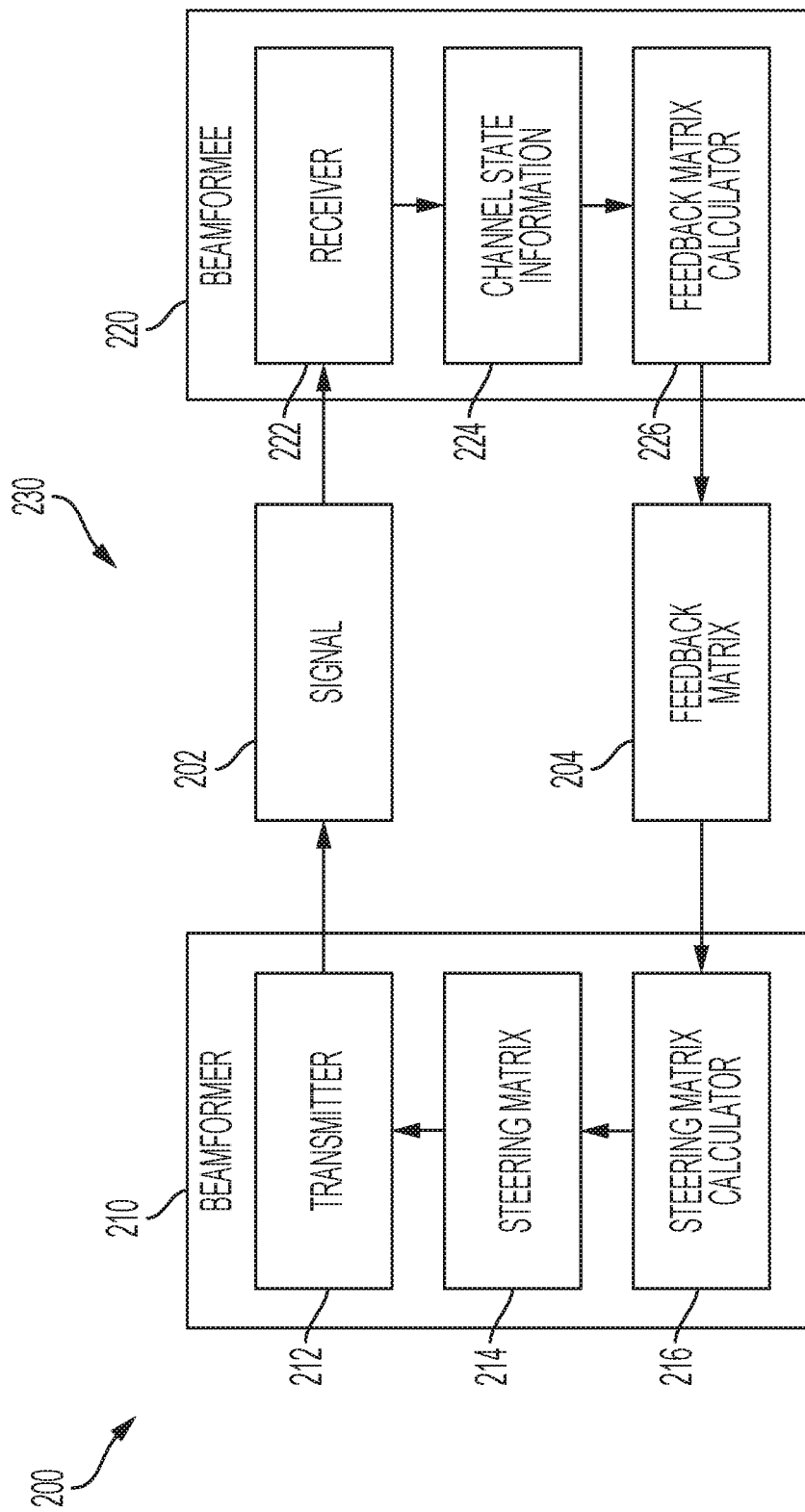
FIGS. 2A-2B are diagrams showing an example beamforming system comprising a beamformer and a beamformee.
Figure 2B:
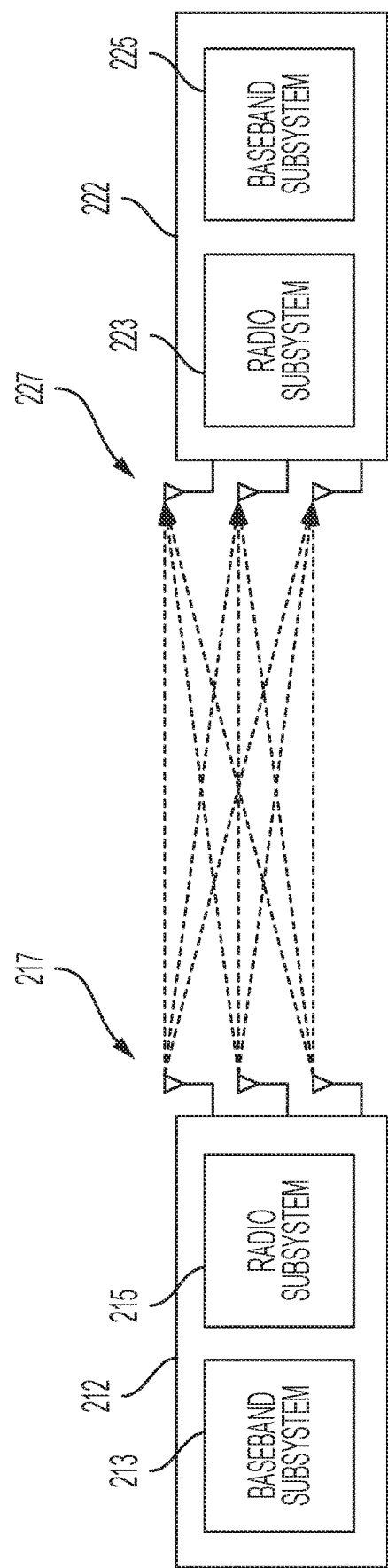

FIGS. 2A-2B are diagrams showing an example beamforming system 200 comprising a beamformer 210 and a beamformee 220. In the examples shown, the beamformer 210 sends a signal 202 to the beamformee 220 over the channel 230 using the transmitter 212. In some instances, the signal 202 includes a null data packet (NDP), also referred to as a sounding packet. The beamformee 220 receives the signal 202 using the receiver 222. The transmitter 212 may include a radio subsystem 215, a baseband subsystem 213, and multiple antennas 217 as shown in FIG. 2B. Likewise, the receiver 222 may include a radio subsystem 223, a baseband subsystem 225, and multiple antennas 227 as shown in FIG. 2B. The respective radio and baseband subsystems may be implemented as described above. In some cases, the transmitter 212 and the receiver 222 each include multiple antennas, and form a multiple-input/multiple-output (MIMO) system.

The beamformee 220 determines channel state information (CSI) 224 based on the signal(s) received at the receiver 222. The beamformee 220 then computes, using the feedback matrix calculator 226, a feedback matrix 204 based on the CSI 224. In some cases, the feedback matrix calculator 226 generates a feedback matrix 204 that correlates to changes in the environment, e.g. the channel in which signal 202 is transmitted. For example, changes within the feedback matrix may be correlated to location and intensity of motion. The feedback matrix 204 is then sent to the beamformer 210. In some cases, the feedback matrix 204 is sent to the beamformer in a compressed format (e.g., as a compressed version of the feedback matrix 204 computed by the feedback matrix calculator 226). The beamformer 210 then generates, using the steering matrix calculator 216, a steering matrix 214 based on the feedback matrix 204. The steering matrix 214 is then used by the transmitter 212 to shape the beam for the next signal transmitted to the beamformee 220. In some cases, the changes to steering matrix 214 quantifies changes to the environment since any change to the radio transmitter 212 or receiver 222 surroundings will cause a change in the propagation of signal 202. For example, as a result of continuous channel sounding performed by system 200, steering matrix 214 will be continuously updated to attempt to minimize the impact of propagation channel changes to the data transmission quality, e.g. the transmission quality of signal 202. By observing changes in steering matrix 214 over time, a motion or presence detection process may determine changes in the physical environment, and in some cases, classify types of physical motion.

In some implementations, the beamforming process performed by the system 200 is based on a standard, such as, for example, an IEEE 802.11 standard. For instance, in some cases, the beamforming process is based on Sections 9, 20, and/or 22 of the IEEE 802.11ac-2013 standard. In some cases, the system 200 can be modeled by Equation (1):

$$y_k = H_k x_k + n \qquad (1)$$

where $x_k$ represents a vector $[x_1, x_2, \ldots, x_n]$ transmitted in subcarrier frequency k by the transmitter 212, $y_k$ represents a vector $[y_1, y_2, \ldots, y_n]$ received by the receiver 222, $H_k$ represents a channel response matrix of dimensions $N_{RX} \times N_{TX}$ (where $N_{RX}$ is the number of antennas at the receiver and $N_{RX}$ is the number of antennas at the transmitter), and n represents white (spatially and temporally) Gaussian noise. When a beamforming process is used, the beamformer 210 applies a steering matrix $Q_k$ to the transmit signal. The system 200 can thus be modeled by Equation (2):

$$y_k = H_k Q_k x_k + n \qquad (2)$$

where $Q_k$ is a matrix of dimension $N_{TX} \times N_{STS}$ (where $N_{STS}$ is the number of elements in $x_k$).

In some implementations, explicit beamforming may be used. For example, explicit beamforming requires explicit feedback from the beamformee 220 of the current channel state. In such implementations, the beamformee 220 computes the channel matrices $H_k$ based on the Long Training Field (LTF) of the beamformer 210 (which is included in a null data packet transmitted by the beamformer 210). The channel matrices may then be encoded into a matrix $V_k$. An example encoding process is outlined in Sections 20.3.12.5 (uncompressed) and 20.3.12.6 (compressed) of the IEEE 802.11 standard. In some cases, the matrix $V_k$ is sent in the Beamforming Report Field (as discussed in Sections 8.4.1.28 and 8.4.1.29 of the IEEE 802.11ac-2013 standard) using the Action No Ack Management Frame (as discussed in Section 8.3.3.14 of the IEEE 802.11ac-2013 standard). The beamformee 220 may also perform a similar beamforming process to determine a steering matrix for sending beamformed signals to the beamformer 210. In other implementations, implicit beamforming may be used. For example, implicit beamforming requires that the beamformer 210 calculate beamforming information as no feedback on the current channel state is provided by the beamformee 220. In such implementations, the beamformer 210 requests the beamformee 220 to send a sounding frame. The beamformee 220 sends the sounding frame (e.g. a null data packet) to the beamformer 220 in response to the request. The beamformer 210 receives the sounding frame and determines the current channel state, e.g. computes a matrices $H_k$, based on reciprocity of the channel with the beamformee 220.

Figure 3A:
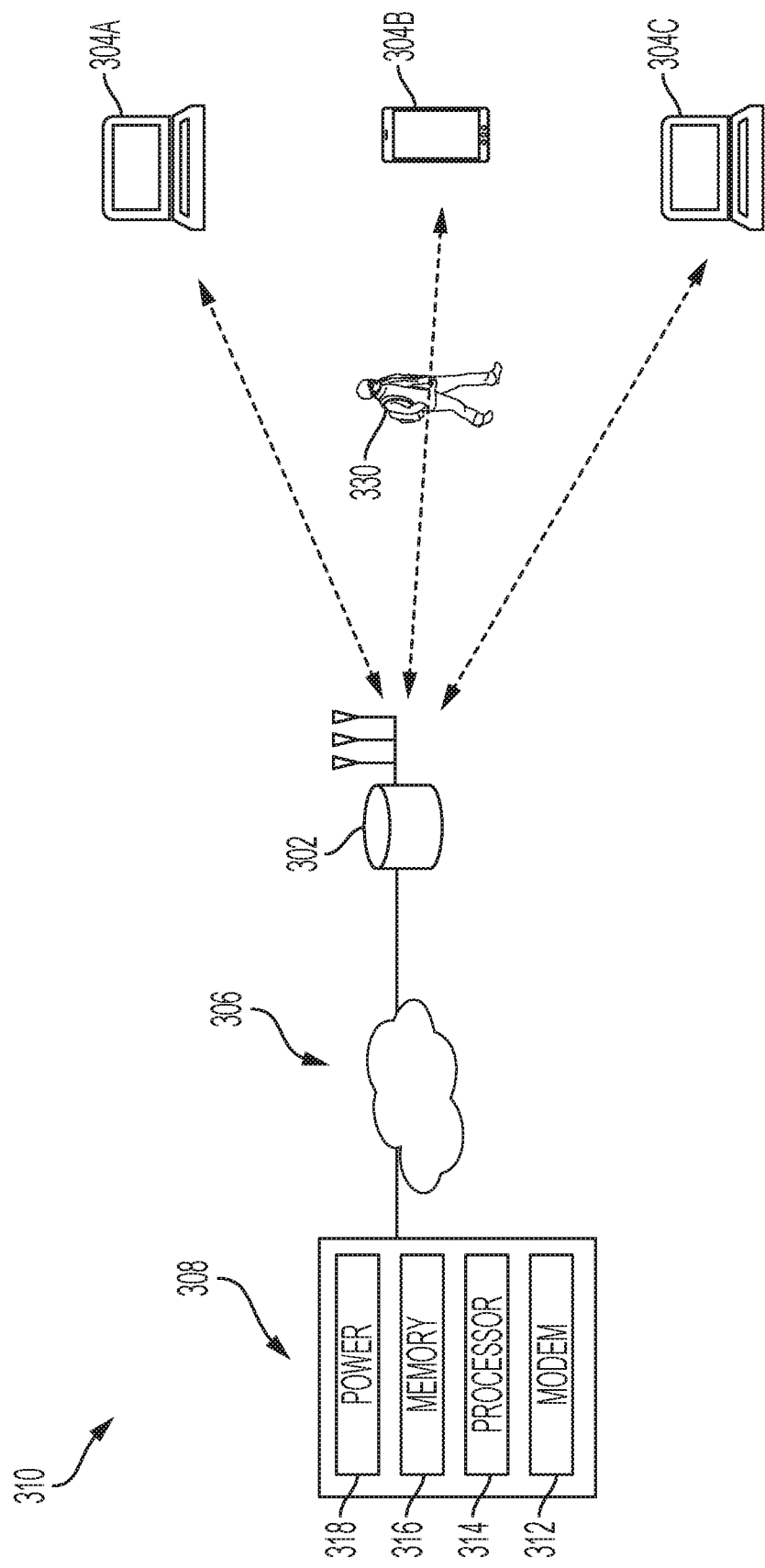
FIGS. 3A-3B are diagrams of example wireless communication systems for detecting motion based on beamforming matrices.
Figure 3B:
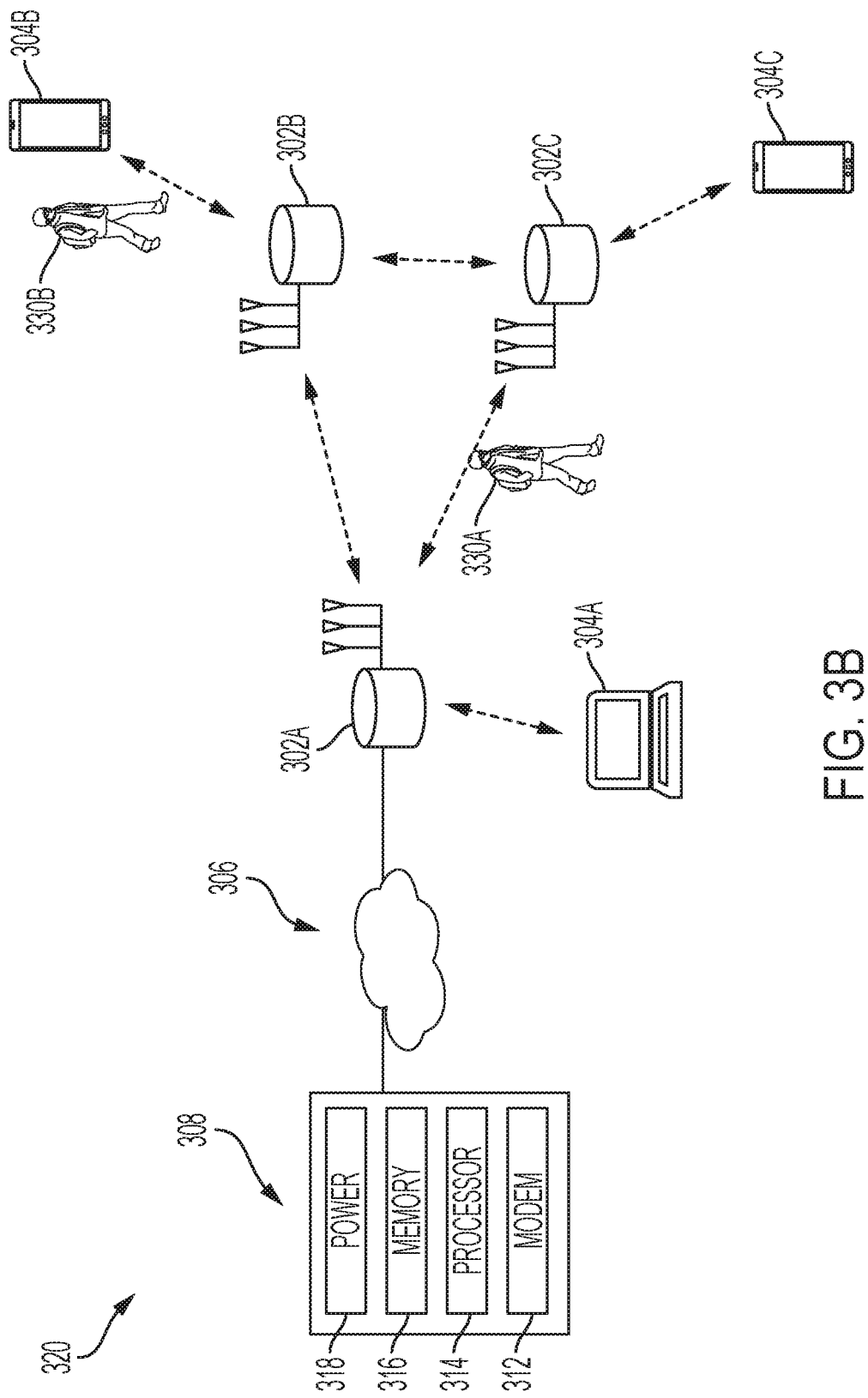

FIGS. 3A-3B are diagrams of example wireless communication systems 310, 320 for detecting motion based on beamforming matrices. In some cases, the wireless communication systems 310, 320 communicate according to one or more aspects of the IEEE 802.11 wireless communication standard. In the example shown in FIG. 3A, the wireless communication system 310 includes a wireless access point (WAP) 302, multiple client devices 304 connected to the WAP 302, a network 306, and a server 308. In the example shown in FIG. 3B, the wireless communication system 320 includes multiple WAPs 302 communicating according to a wireless mesh protocol, multiple client devices 304 connected to the WAPs 302, a network 306, and a server 308. The server 308 include a modem 312, processor 314, memory 316, and power unit 318. The modem 312 may be implemented similarly to the modem 112 of FIG. 1, the processor 314 may be implemented similarly to the processor 114 of FIG. 1, the memory 316 may be implemented similarly to the memory 116 of FIG. 1, and the power unit 318 may be implemented similar to the power unit 118 of FIG. 1. The network 306 may be any type of network that communicably couples the server 308 to the WAPs 302 and devices 304 (e.g., LAN, WAN, the Internet, or a combination thereof).

In the examples shown, the wireless communication systems 310, 320 implement a beamforming protocol, e.g. to generate and transmit beamforming information from one wireless device to another wireless device. For example, the wireless communication devices can implement a beamforming protocol similar to those described above. In each example, the WAP(s) 302, client devices 304, or both can detect motion of the objects 330 based on analyzing beamforming dynamic information (e.g., steering or feedback matrices). In some examples (e.g., the wireless communication system 310), sounding and beamforming is performed between a WAP 302 and client devices 304, and motion is detected at the WAP 302 by observing changes in a beamforming matrix (e.g., the steering matrix). Motion may also be localized by the WAP 302 based on changes in the respective beamforming matrices for each connection with a client device 304. In mesh examples (e.g., the wireless communication system 320), sounding and beamforming is performed between WAPs 302 and their respective client devices 304 and motion information is determined at each of the WAPs 302. The motion information can then be sent to a hub device (e.g., one of the WAPs 302) or another device (e.g., the server 308) to analyze the motion information and make an overall determination of whether motion has occurred in the space, detect a location of detected motion, or both. In some examples, the client devices 304 may also determine motion information based on beamforming matrices (e.g., feedback matrices). In such cases, motion may be detected based on channel state information (CSI) or the feedback matrix estimation that is calculated as a result of receiving a null data packet frame or other type of WIFI frame. The motion information may then be passed to a hub device (e.g., one of the WAPs 302) or another device (e.g., the server 308) to make an overall determination of whether motion has occurred in the space, detect a location of detected motion, or both.

Figure 4B:
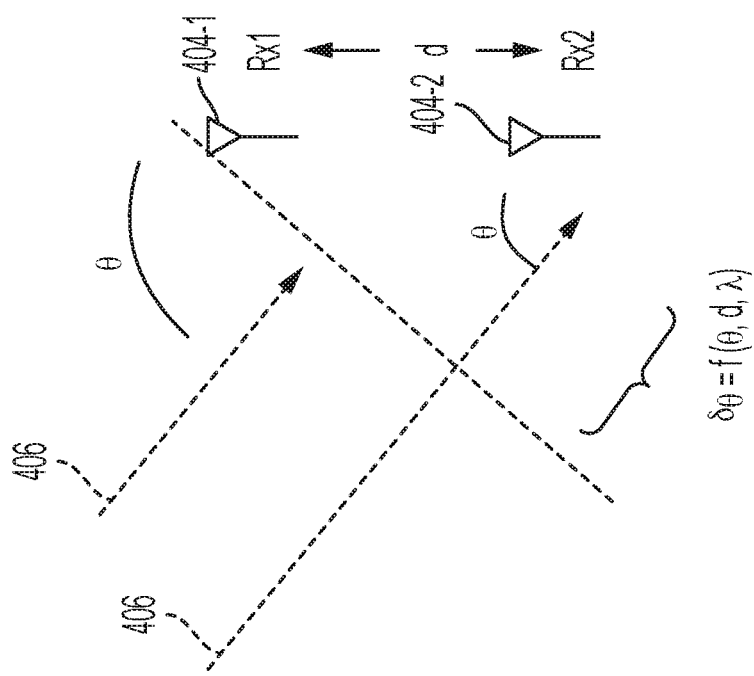

FIGS. 4A-4B are diagrams showing an example wireless communication system 400 with objects 410, 420, 430 in a space between a transmitter 402 and a receiver 404. In the examples shown, signals 406, 408 are sent between the respective antennas of the transmitter 402 and receiver 404. In this example, the signal 406 is reflected off object 410, and signal 408 is reflected off object 420.

As illustrated in FIG. 4B, depicting a view of the right-hand side of FIG. 4A, because of the angle of arrival θ of the signals, e.g. signal 406, and the distance d between the respective antennas of the receiver 404, the signals must traverse an additional distance $\delta_\theta$ to arrive at the $R_{x2}$ antenna 404-2 versus the $R_{x1}$ antenna 404-1 of the receiver 404. Thus, in an example, the signal 406 arrives at the antennas 404-1, 404-2 of the receiver 404 at different times. As shown, the distance $\delta_\theta$ can be determined as a function of the angle θ, the distance d, and the wavelength λ of the signal. The values d and λ are generally constant, and thus, the distance $\delta_\theta$ may be mainly based on the angle θ. The system 400 may generally be modeled by Equation (3):

$$\begin{bmatrix} R_{x1} \\ R_{x2} \end{bmatrix} = \begin{bmatrix} h_{11} & h_{21} \\ h_{12} & h_{22} \end{bmatrix} \begin{bmatrix} T_{x1} \\ T_{x2} \end{bmatrix} = H \begin{bmatrix} T_{x1} \\ T_{x2} \end{bmatrix} \quad (3)$$

or specifically, in the example shown, by Equation (4):

$$\begin{bmatrix} R_{x1} \\ R_{x2} \end{bmatrix} = \begin{bmatrix} 1 & e^{-2\pi\delta_\theta} \\ e^{-2\pi\delta_\theta} & 1 \end{bmatrix} \begin{bmatrix} T_{x1} \\ T_{x2} \end{bmatrix}. \quad (4)$$

Here, $R_{x1}$ represents the signal received by the antenna 404-1, $R_{x2}$ represents the signal received by the antenna 404-2, $T_{x1}$ represents the signal transmitted by a first antenna of the transmitter 402, and $T_{x2}$ represents the signal transmitted by a first antenna of the transmitter 402. From the above, it is seen that, in this example with two transmitter antennas and two receiver antennas, the H-matrix can be written $$H = \begin{bmatrix} 1 & e^{-2\pi\delta_\theta} \\ e^{-2\pi\delta_\theta} & 1 \end{bmatrix}.$$

In some implementations, a spatial map of observed "modes" (created by objects in the space) may be generated. Each mode may be represented by a portion of the square matrix H in Equations (3) and (4). For instance, a first mode may be represented by the matrix $$\begin{bmatrix} 1 \\ e^{-2\pi\delta_\theta} \end{bmatrix}$$

while a second mode may be represented by $$\begin{bmatrix} e^{-2\pi\delta_\theta} \\ 1 \end{bmatrix}.$$

The composition of the matrix H in Equations (3) and (4) indicates that its rows represent an impact of the transmitter, and the columns represent an impact of the receiver. A channel response may be considered as a superposition of many different scattering modes. However, close to the receiver, the receive mode can be dominant. We can therefore extract columns from the H matrix, and understand them as receive modes which carry spatial information. Each receive mode can be converted to a spatial map that shows relative power levels of received signals in the angular domain. In some cases, the spatial map can be created by performing a Fourier analysis on the extracted columns of the H matrix. The Fourier analysis may correspond to multiplying and accumulating the extracted columns with exponential functions representing projection of different angles of arrival on the receive antenna array. This projection represents an angular sine wave that a certain inclined ray will create on the multiplicity of receive antennas. By multiplying and accumulating the column vector with difference Fourier basis, a picture of where energy is located in the angular domain may be generated. This energy-angle picture would be increasingly accurate in the vicinity of the receiver. In some implementations, the peaks of the spatial map or the overall shape can be tracked using different tracking filters to determine whether motion has occurred in a space.

In some cases, each of the extracted modes can be Fourier analyzed to create its constituent components, and those components can be tracked to yield information on the changes occurring in the channel. Some changes like angles are directly translate-able to physical intuition while others are indirectly related. Even though changes may be indirectly related, they can be associated with different actions (e.g., using a supervised training classifier such as a neural network).

In some implementations, the feedback matrix generated by a receiver (e.g., the feedback matrix 204 of FIG. 2A) can be used to create a spatial map, since the feedback matrix 204 represents the matrix H above. In some implementations, the steering matrix generated by a transmitter (e.g., the steering matrix 214 of FIG. 2A) can be used to create a spatial map, since it can be thought of as an inverse of the feedback matrix (one can be used to reconstruct the other). In some cases, a beamformer and beamformee can change roles and determine information on the reciprocal channel. For example, the roles of the beamformer 210 and beamformee 220 may alternate between two wireless communication devices as they communicate with each other. Either or both of the devices can use the information generated by the beamforming process to determine whether motion has occurred in the space between the devices.

In some instances, a first device may send a wireless signal to a second device, which may be denoted as an observation device. In one example, with respect to FIG. 3A, WAP 302 may be the first device. There may be one or many observation devices in communication with the first device, for example, one or more of client devices 304A-C illustrated in FIG. 3A may be observation devices. In one example, the first device may be a central controller. In some cases, the central controller may be configured for detecting motion. In some cases, the first device may be comprised in a motion detection system. In this example, a second device may comprise a user device, for example, a personal computer, laptop, mobile phone, smart phone, and wearables, Internet of things (IOT) device, or other wireless device. In one implementation, the one or more second devices do not contain motion detection software and are not otherwise configured to perform motion detection in a motion detection system.

In one aspect, in response to receiving a wireless signal from a first device, a second device computes a feedback matrix or other beamforming dynamic information. For example, the second device may compute an H-matrix and/or V-matrix. The H-matrix, e.g. $H_k$, and V-matrix (or matrix V), e.g. $V_k$, are described above. In some cases, the second device may compute any other beamforming dynamic information related to the wireless environment based on the wireless signal. In an implementation, the H-matrix, V-matrix, and/or other beamforming dynamic information related to the environment, that has been computed is fed back from the second device. In this example, the wireless signal is not indicated as a motion detection signal, or other signal requesting motion measurements. In some cases, the first device does not compute a steering matrix based on feedback from the second device. The H-matrix, V-matrix, and/or other beamforming dynamic information computed by the second device is based on the wireless signal transmitted by the first device. In some cases, the H-matrix, V-matrix, and/or other beamforming dynamic information computed by the second device is transmitted to the first device via a wireless protocol that exists between the two wireless devices. In some cases, the protocol is a wireless standard protocol. In some cases, the second device sends an H-matrix feedback response. In other cases, the second device may send V-matrix feedback response. In other cases, the second device may send other beamforming dynamic information based on the wireless signal. In one implementation, the first device may detect motion occurring between the first device and the second devices based on the feedback received from one or more second devices.

Figure 5A:
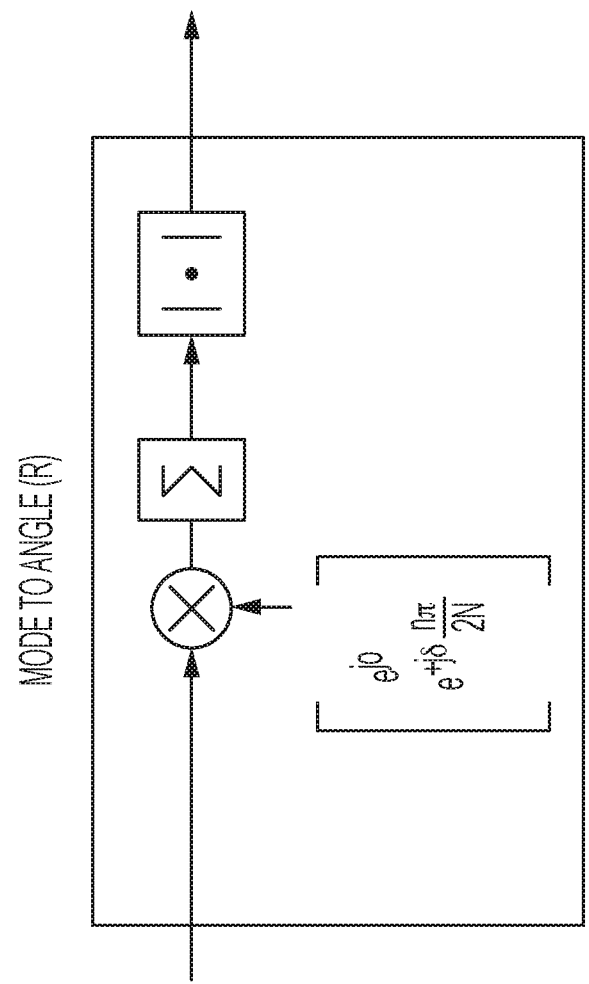
Figure 5A:
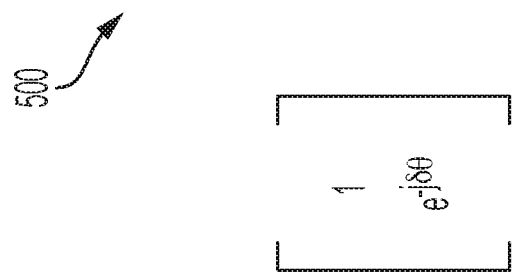

FIGS. 5A-5B are diagrams showing an example spatial map generation process for a first mode of a motion detection system. In particular, FIG. 5A shows an example filter 500 for generating a spatial map for the first mode listed above (corresponding to the object 410 of FIG. 4A), and FIG. 5B shows an example spatial map 510 generated from the output of the filter 500. The example filter 500 performs a summing operation over a range of values for n and θ, where n is an integer ranging from 1 to N (where N represents the granularity of the spatial map) and θ is a value ranging from 0 to π/2. The filter 500 may produce an output as shown by filter output 512 of FIG. 5B. In some cases, a number of values are generated by the summing operation performed by the filter 500, with each value being associated with an angle θ. The values may be mapped as shown by the spatial map 510 to display a spatial readout of the objects in the space (relative to the angle θ). The spatial map 510 may represent a relative intensity of the radiation as a function of direction. Thus, maxima of the spatial map 510 may indicate a direction of an object (e.g., the object 410) in the space relative to the receiving wireless communication device.

Figure 6B:
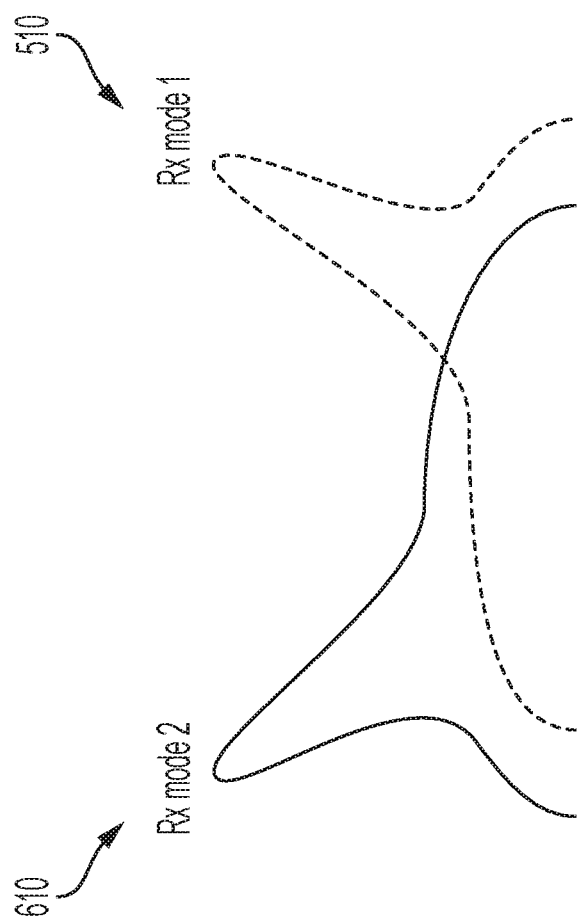

FIGS. 6A-6B are diagrams showing an example spatial map generation process for a second mode of a motion detection system. In particular, FIG. 6A shows an example filter 500 for generating a spatial map for the second mode listed above (corresponding to the object 420 of FIG. 4A), and FIG. 6B shows an example spatial map 610 generated from the output of the filter 600 along with the spatial map 510 generated by the output of the filter 500. The spatial map 610 may represent a relative intensity of the radiation as a function of direction. Thus, maxima of the spatial map 610 may indicate a direction of an object (e.g., the object 420) in the space relative to the receiving wireless communication device.

Figure 6C:
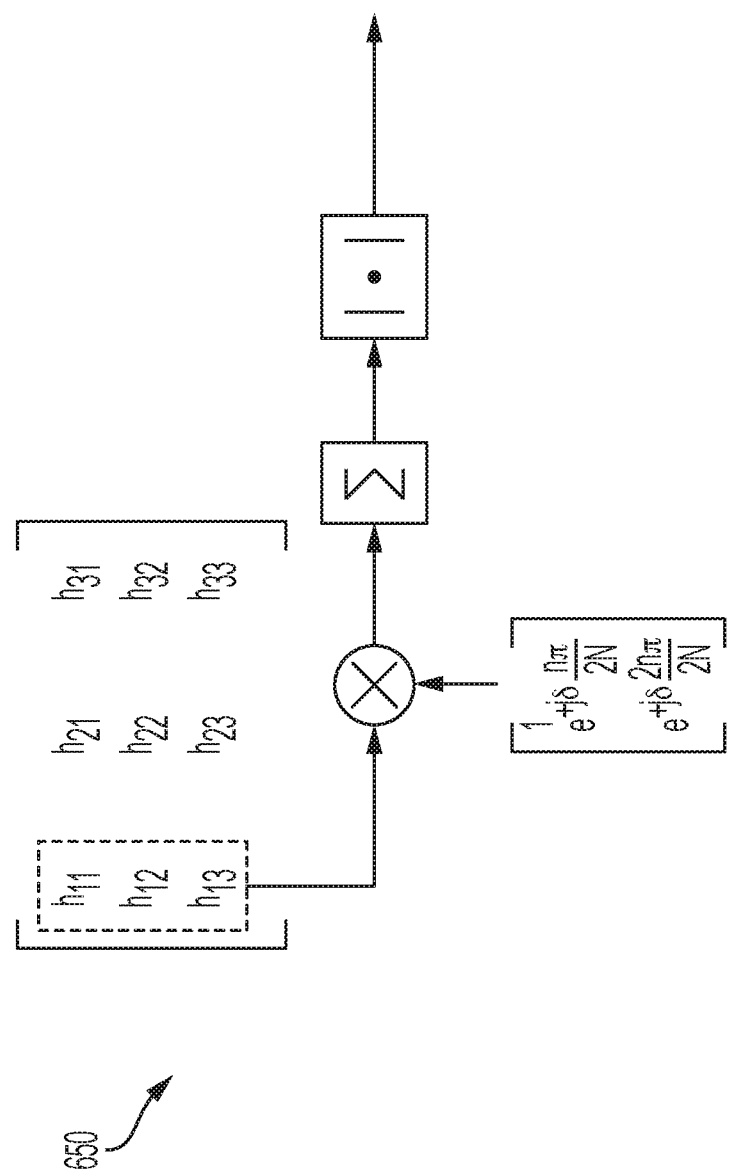

Filters similar to the filters 500 and 600 may be setup for higher order MIMO systems, as shown in FIG. 6C. FIG. 6C illustrates example filter 650 for generating a spatial map for a mode in which there are three receive antennas, denoted by the entries in the first column. Similar to filters 500 and 600, the example filter 650 produces an output, the values of which may be mapped to display a spatial readout (not shown) of the objects in the space (relative to the angle θ). In some cases, the number of modes for a wireless communication system may be dependent on the number of transmit/receive antenna pairs.

Figure 7:
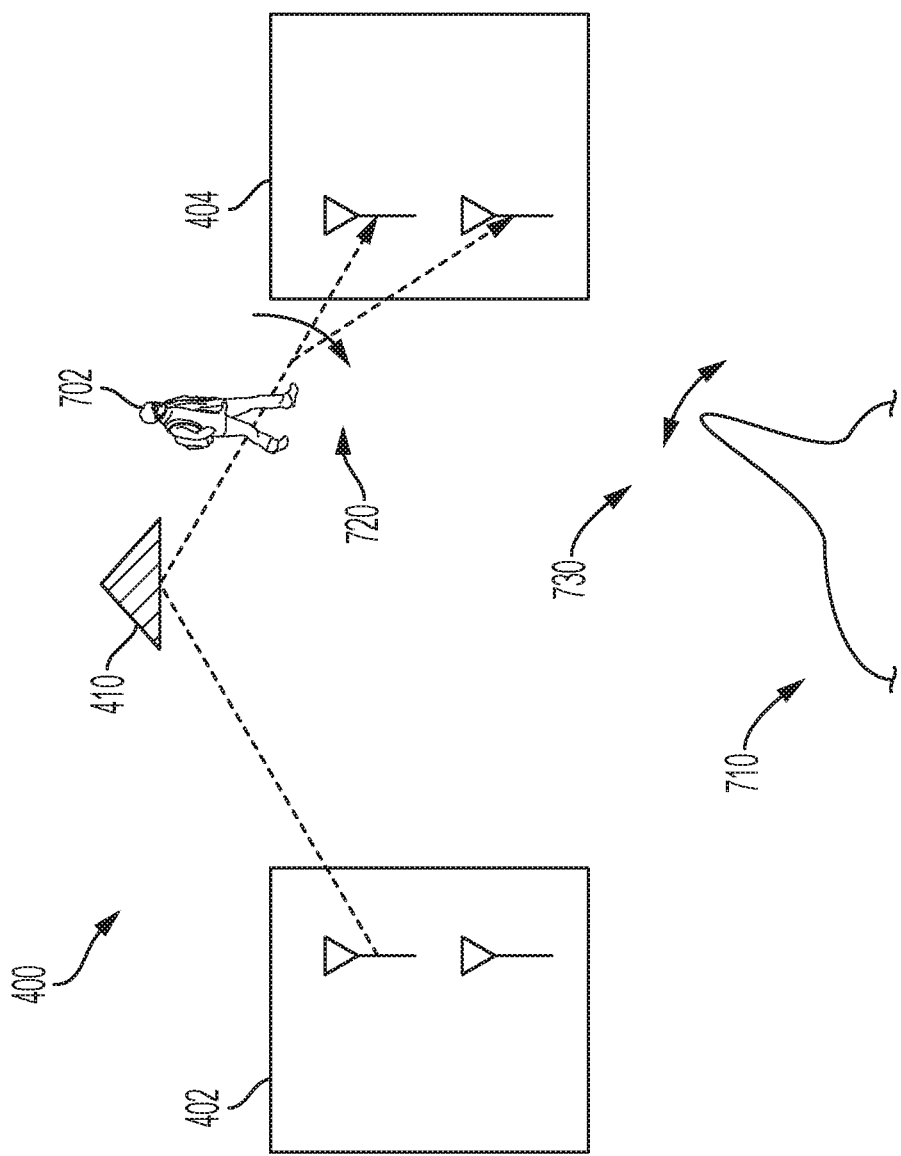
FIG. 7 is a diagram showing the example system of FIGS. 4A-4B with a person in the space.

FIG. 7 is a diagram showing the example system 400 of FIGS. 4A-4B with a person 702 in the space. Also shown in FIG. 7 is a spatial map 710 for the mode represented by the object 410. When the person 702 moves within the space as shown, the incident angle 720 of the wireless signals to the antennas of the receiver 404 will change, causing a corresponding change in the maximum 730 of the spatial map 710. Thus, by analyzing or tracking changes in the maxima of spatial maps, motion of an object (e.g., the person 702 or another type of object) may be detected in a space accessed by wireless signals. In addition, a relative location of the detected motion may be determined using the spatial maps, since the maxima may indicate a direction of the object scattering the signals in the space.

Figure 8:
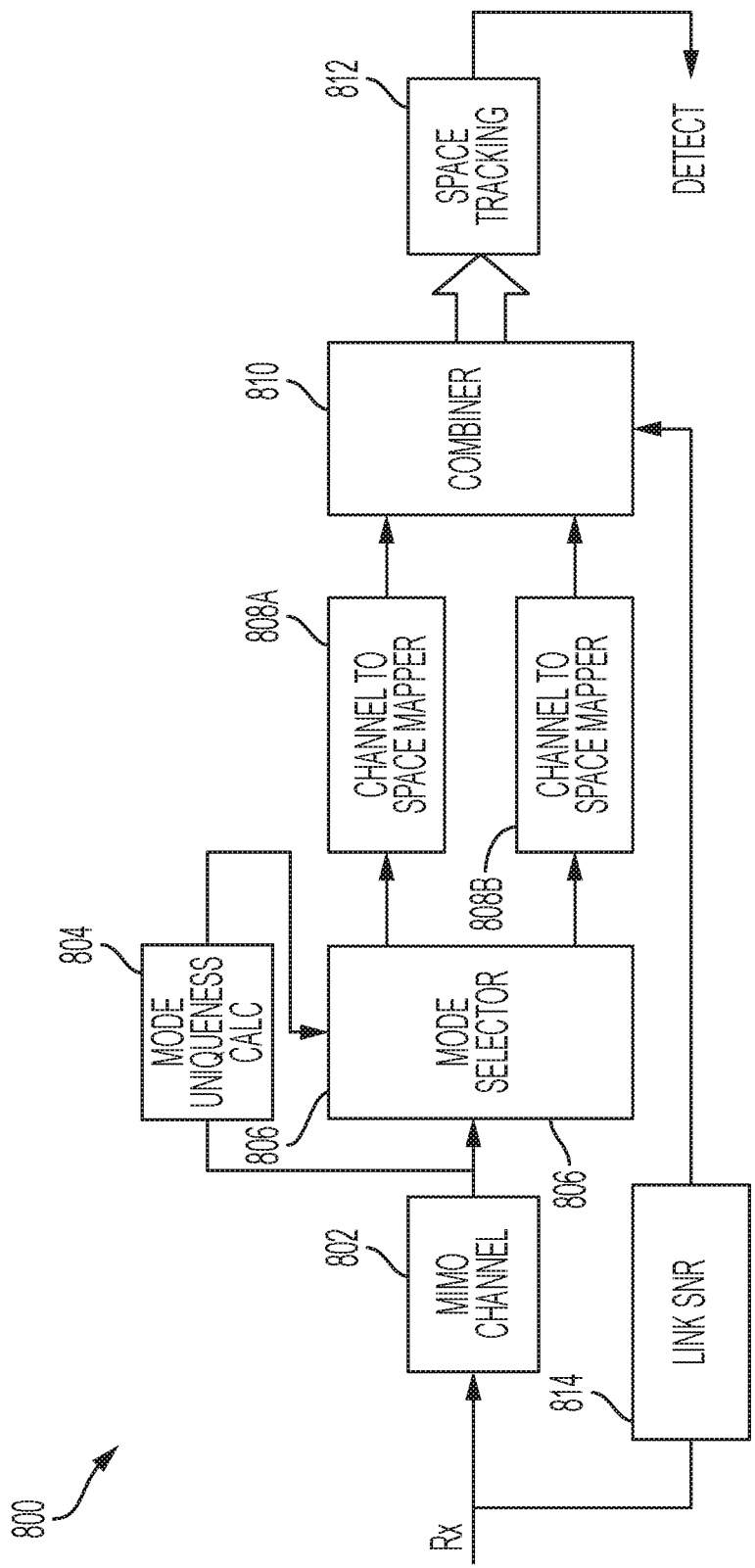
FIG. 8 is a diagram showing an example system for generating a spatial map based on received wireless signals.

FIG. 8 is a diagram showing an example system 800 for generating a spatial map based on received wireless signals. In the example shown, the system 800 extracts a certain mode and converts it into a spatial map (e.g., similar to the spatial maps 510, 610, 710 of FIGS. 5B, 6B, 7, respectively). In the example shown, unique modes are extracted from the MIMO channel 802. In some cases, the unique modes are equivalent to the rank of a channel matrix (e.g., the matrix H of Equation (3)), as the unique modes may specify the number of unique paths existing within a channel. The independence of the paths in a channel is what allows MIMO systems to send multiple data streams simultaneously. In some implementations, a number of independent modes present in the channel matrix is determined. This determination may include decomposing the channel matrix into its eigen (effective) components and performing a nonlinear thresholding over those eigen components to come up with an effective number of significant components that comprise the channel matrix.

Once the significant components and their significance values are determined, one or more of the values may be tracked. In the example shown in FIG. 8, the mode uniqueness calculator 804 computes these components and sends them to the mode selector 806, which tracks the significant components. Each of the tracked components is passed to a channel to space mapper 808A, 808B, corresponding to the mode. The example channel to space mappers transform their respective components into some measure of variation happening in the channel. For example, a channel to space mapper can map an eigen component to different representations in time-domain, angular domain, or other domain, to derive a measure of physical changes happening in the channel at any given instant. The channel to space mappers provide their output to a combiner 810, which combines all the detected changes and provides its output to a tracker 812 that tracks changes (e.g., using a tracking filter like Kalman). In the example shown, the combiner is seeded with link signal-to-noise ratio (SNR) information 814, which allows the combiner to weight down decisions from different channel instances based on the respective SNRs.

Figure 9:
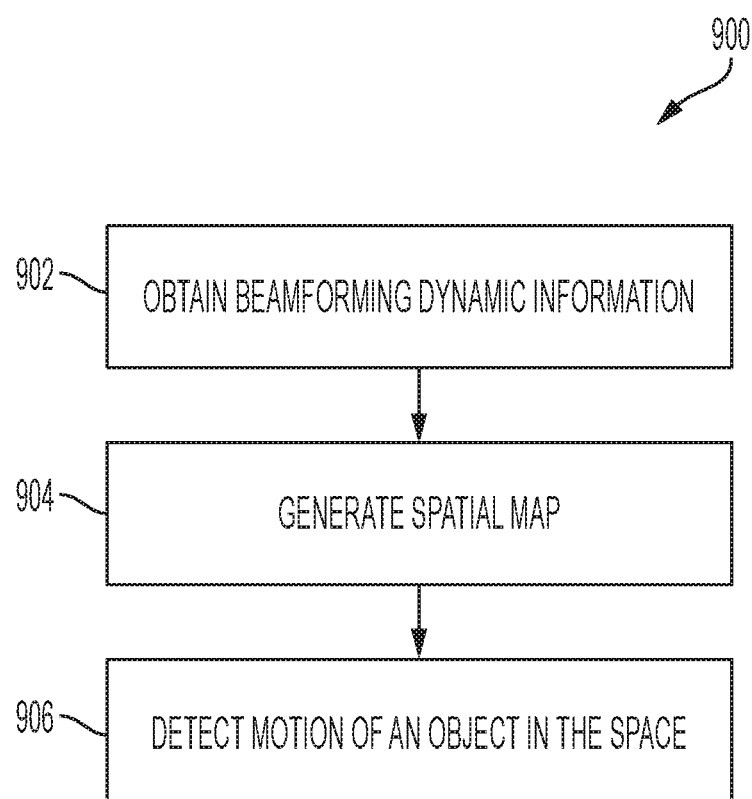
FIG. 9 is a flow diagram showing an example process of detecting motion based on received wireless signals.

FIG. 9 is a flow diagram showing an example process 900 of detecting motion based on beamforming dynamic information. In some instances, the process 900 may be implemented to detect motion of an object in a space based on signals transmitted on a selected wireless communication channel. Operations in the example process 700 may be performed by a data processing apparatus (e.g., the processor 114 of the example wireless communication device 102C in FIG. 1) to detect motion based on signals received at wireless communication devices (e.g., wireless communication device 102C of FIG. 1). The example process 900 may be performed by another type of device. For instance, operations of the process 900 may be performed by a system other than the wireless communication device 102C that receives the signals (e.g., a computer system connected to the wireless communication system 100 of FIG. 1 that aggregates and analyzes signals received by the wireless communication device 102C).

The example process 900 may include additional or different operations, and the operations may be performed in the order shown or in another order. In some cases, one or more of the operations shown in FIG. 9 are implemented as processes that include multiple operations, sub-processes or other types of routines. In some cases, operations can be combined, performed in another order, performed in parallel, iterated, or otherwise repeated or performed another manner.

At 902, beamforming dynamic information is obtained. Beamforming dynamic information may be based on a set of wireless signals transmitted through a space from a first wireless communication device to a second wireless communication device, such as, wireless communication devices 302 and 304 shown in FIG. 3A. The beamforming dynamic information may include a beamforming matrix, such as a feedback or steering matrix generated by a beamformee or beamformer, respectively, in a beamforming communication protocol. For example, the beamforming matrix may include a feedback matrix similar to the feedback matrix 204 of FIG. 2A, or a steering matrix similar to the steering matrix 214 of FIG. 2A. In some implementations, the beamforming dynamic information is obtained as part of a standardized process. For example, in some cases, the beamforming dynamic information is obtained as part of an IEEE 802.11 standard (e.g., the IEEE 802.11ac-2013 standard).

At 904, a spatial map is generated based on the beamforming dynamic information obtained at 902. The spatial map may be a representation of relative intensity of the radiation of received wireless signals as a function of direction (with respect to the receiver). In some implementations, the spatial maps are generated based on a beamforming matrix obtained at 902 (e.g., a feedback or steering matrix). The spatial maps may include a representation of each mode in the wireless communication system. For example, the spatial map may be similar to the spatial map 610 of FIG. 6B. The spatial map may be generated using a filter, similar to the filters 500, 600 of FIGS. 5A, 6A.

At 906, motion of an object in the space is detected. The motion may be detected based on the beamforming dynamic information obtained at 902, the spatial map(s) generated at 904, or a combination thereof. For example, motion may be detected based on a change over time seen in a feedback matrix obtained at 902. As another example, motion may be detected based on a change over time seen in a spatial map generated at 904. In some cases, a neural network may be used at 908 to detect whether motion has occurred in the space. For example, a neural network (convolutional or fully-connected) may be trained with past known motion/no-motion data such that it can identify, as an output, whether motion is occurring at a current time based on an unknown inputs of the beamforming dynamic information, spatial maps, or both.

Figure 10:
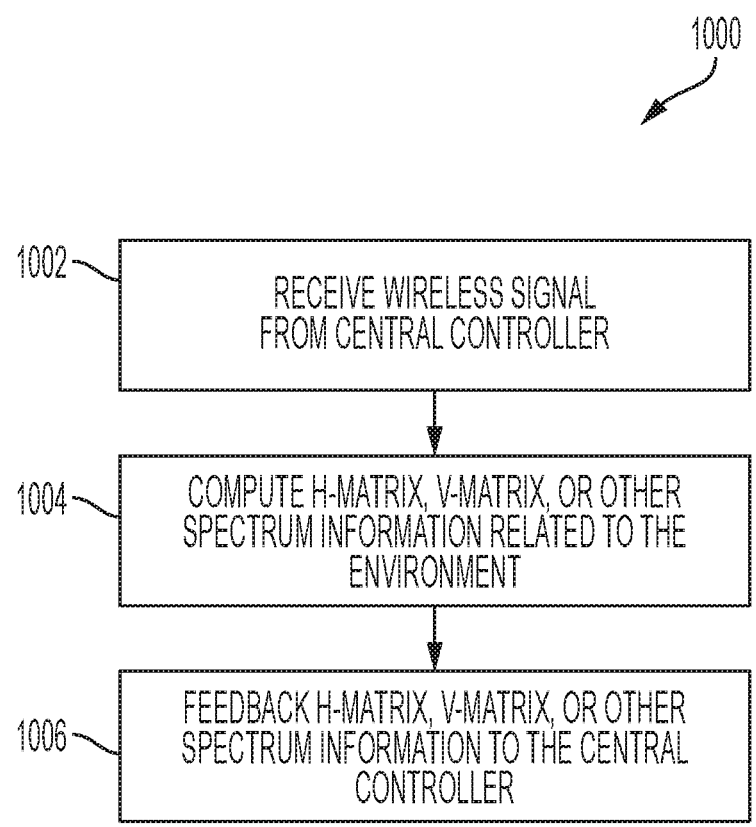
FIG. 10 is a flow diagram showing an example process of detecting motion using a central controller.

FIG. 10 is a flow diagram showing an example process 1000 of an observation device, e.g. a receiver, receiving a wireless signal from a computing device, e.g. a transmitter device. In one implementation, a computing device, e.g. a WAP 302 illustrated in FIGS. 3A and 3B, which may be further configured as a central controller, sends a wireless signal. The computing device may transmit the wireless signal using one or more antennas of the computing device. At 1002, the wireless signal may be received by one or more observation devices, for example, any of devices 304A-C in FIG. 3A. An observation devices may receive the wireless signal using one or more antennas of the observation device. In an example, the central controller may control the motion detection process 1000 by collecting feedback from one or more observation devices for use in detection motion in a space. In some cases, the computing device and the one or more observation devices may form an ad-hoc network.

At, 1004, each of the observation devices that receive the wireless signal computes an H-matrix, V-matrix, or other beamforming dynamic information related to the environment. At 1006, the observation device feeds back its respective H-matrix, V-matrix, or other beamforming dynamic information to the computing device. Motion may be detected at the computing device by analyzing any changes that occur in the H-matrix, the V-matrix, and/or any other beamforming dynamic information related to the environment, provided by the observation devices. In some cases, the computing device may detect motion occurring in a space traversed by wireless signals transmitted between the observation devices and the computing device. In some instances, the computing device transmits a wireless standard protocol message in the wireless signal to one or more observation devices. For example, the wireless standard protocol message may be an explicit beamforming request, implicit beamforming request, PROBE request, ping, etc. In some cases, the wireless standard protocol message may also include standard data traffic. In one case, the wireless standard protocol message may be defined by one of the IEEE 802.11 standards. In some cases, the one or more observation devices respond with a wireless standard protocol response to the wireless signal received from the computing device. For example, one or more of the observation devices may respond to a wireless standard protocol message from the computing device with a response in accordance with a protocol of the wireless standard, e.g. an IEEE 802.11 standard. In one example, one or more of the observation devices may transmit an H-matrix, V-matrix, or other beamforming dynamic information to the computing device, in response to receiving a wireless standard protocol message from the computing device. In some cases, the wireless standard protocol message may be sent individually to one or more devices, e.g. device 304A, and in other cases, may be broadcast to all the observation devices, e.g. devices 304A-C, communicating wirelessly with the computing device. In some cases, the number of observation devices in communication with the computing device is not fixed. In some instances, observation devices, e.g. devices 304A-C, are not configured for motion detection, for example, the observation devices may not be configured as motion detection devices, e.g. with programmed motion detection hardware or software, in a motion detection system. In some cases, the computing device and the observation devices form an ad-hoc motion detection network. In an example, the standard protocol message sent by the computing device is a standard PROBE Request message, and an observation device sends a response to a PROBE Request message in accordance with the protocol. In some cases, the computing device sends a ping signal, also referred to as, a sounding signal, Null Data Packet (NDP) channel sounding signal, or pilot signal. For example, an observation device may recognize the ping signal and its structure. In other cases, the computing device may send a signal which the observation device does not recognize. A signal whose structure is not recognized by the observation device may be referred to as a blind-aided channel estimator, a data-aided decision channel estimator, or a decision-aided channel estimator. However, these types of signals may produce a large amount of noise, which in some cases, may affect the observation device's measurements.

In another aspect, a computing device, e.g. transmitter device, may send a wireless signal to all neighbor devices. The transmitter device, in some examples, may be a first device, as described above. For example, the transmitter device may be configured as a WAP 302, illustrated in either FIG. 3A or 3B, or may be a central controller. Neighbor devices may be observation devices that are reachable by the transmitter device, e.g. devices that are in proximity to the transmitter device and able to receive wireless signals transmitted from the transmitter device. However, the transmitter device may not have knowledge of which devices, or the number of devices, that may be in proximity to the transmitter device. Neighbor devices, in some examples, may be second devices (or observation devices), as described above. In some cases, neighbor devices may include devices configured as other WAPs 302 or any other wireless device capable of receiving wireless signals, such as, user device, a personal computer, laptop, mobile phone, smart phone, and wearables, Internet of things (IOT) device, or other wireless device, or a combination thereof.

In one instance, the transmitter device may transmit a single wireless signal to all neighbor devices. In an example, the wireless signal may be a ping signal (described above). The ping signal may be transmitted via broadcast to all neighbor devices, or may be multicast or unicast to select neighbor devices, which may be determined based on the wireless standard or the wireless configuration of the transmitter device. When a neighbor device receives a ping signal, it may use the ping signal as a reference signal to generate an H-matrix (or the V-matrix), also referred to as a feedback matrix. In some cases, the ping signal is transmitted according to a standard protocol, e.g. IEEE 802.11, and the neighbor device processes the ping signal to generate a feedback matrix, according to the corresponding wireless standard protocol response. The neighbor device, in some cases, may use the H-matrix and/or V-matrix to compute motion indicator values at the neighbor device. In some cases, the computed values may be used by the neighbor device to detect motion, or in other cases, may be sent back to the transmitter device for further analysis. In another example, the ping signal indicates to the neighbor devices to compute the H-matrix and/or V-matrix based on the ping signal and send the matrix, or matrices, in raw form, e.g. without any additional processing by the neighbor device. In that case, the transmitter device performs further analysis on the H-matrix (or V-matrix) to detect motion.

Figure 11:
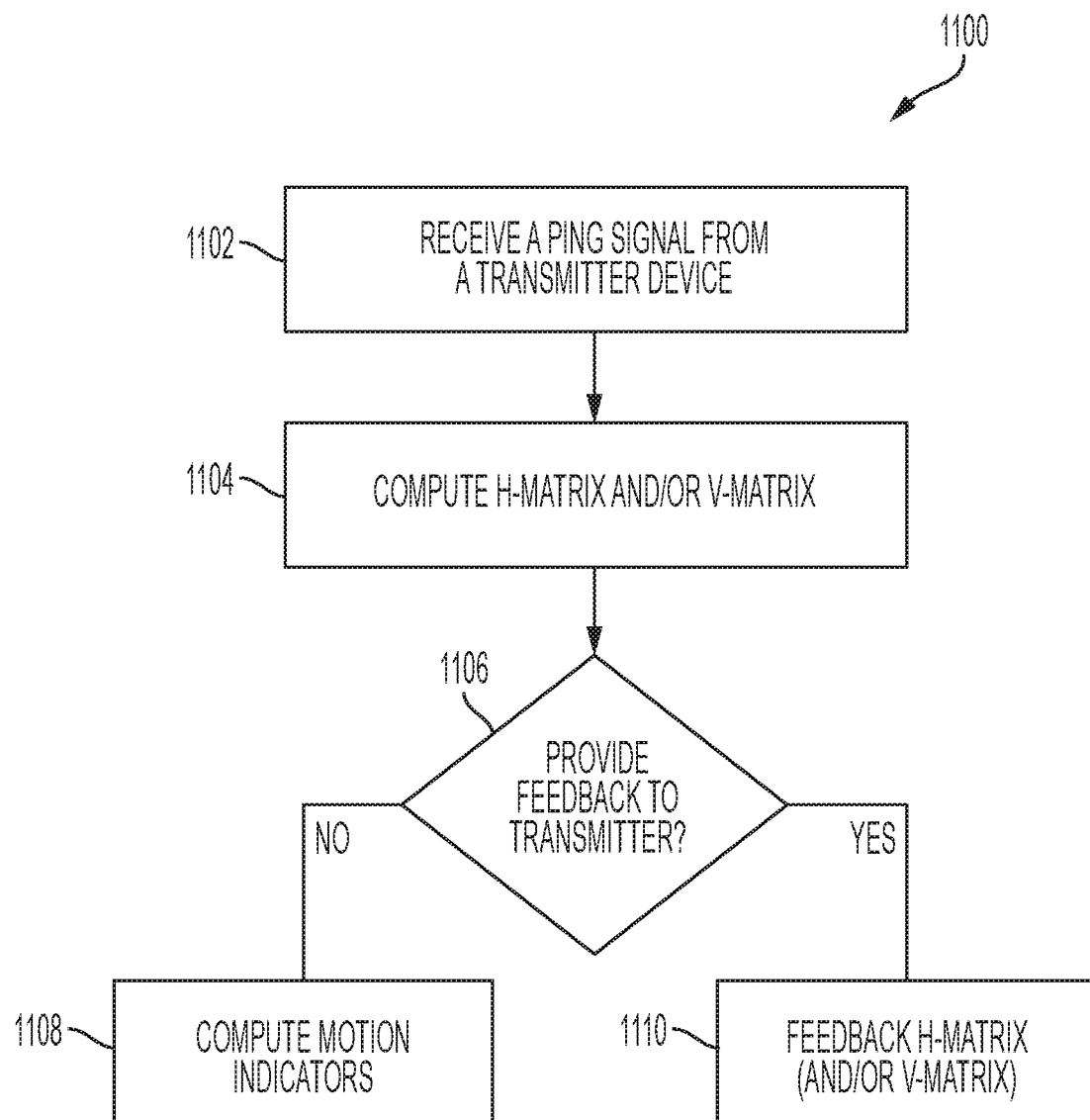
FIG. 11 is a flow diagram showing an example process of processing a ping request.

FIG. 11 is a flowchart 1100 that illustrates an example of neighbor devices processing a ping signal from a transmitter device. In some cases the transmitter device may send a different type of wireless signal, e.g. an explicit beamforming request, an implicit beamforming request, or a PROBE request, as discussed in FIG. 10. In some cases, each neighbor device may determine, or otherwise have knowledge, regarding whether it is configured with motion detection capabilities, e.g. whether it has motion detection software, such as motion detection device 1220 (described below and in FIG. 12). At 1102, each neighbor device receives the ping signal from the transmitter device. At, 1104, each neighbor device generates beamforming information feedback, such as a feedback matrix, e.g. an H-matrix and/or V-matrix, and in some cases a compressed V-matrix (depending on the device capabilities), in response to receiving the ping signal. At 1106, each of the neighbor devices determines whether to compute motion indicator values at the device itself at 1108, or to feedback information to the transmitter, at 1110, so that the transmitter may compute the motion indicator values. For example, in one case, the ping signal may indicate to the neighbor device that the device should feedback its respective H-matrix or V-matrix. In another case, a neighbor device may feedback its respective H-matrix or V-matrix when the neighbor device is not configured with motion detection capabilities. However, in other cases, when a neighbor device is configured with motion detection capabilities, the corresponding motion detection process may determine which action the neighbor device takes, e.g. the motion detection process may direct the neighbor device to either compute motion indicator values at the device, or in other cases, to feedback its respective H-matrix or V-matrix rather than compute motion at the neighbor device. In some cases, the H-matrix and/or V-matrix are sent to the transmitter device in raw form, e.g. without further processing by the neighbor device.

In an example, if motion is detected in the space by a device, e.g. at a neighbor device, then a motion indicator value (MIV) is computed by the device. The MIV represents a degree of motion detected by the device based on the wireless signals transmitted or received by the device. For instance, higher MIVs can indicate a high level of channel perturbation (due to the motion detected), while lower MIVs can indicate lower levels of channel perturbation. Higher levels of channel perturbation may indicate motion in close proximity to the device. The MIVs may include aggregate MIVs (representing a degree of motion detected in the aggregate by the respective device 402), link MIVs (representing a degree of motion detected on particular communication links between respective devices 402), path MIVs (representing a degree of motion detected on particular communication paths between hardware signal paths of respective devices 402), or a combination thereof. In some implementations, MIVs are normalized, e.g. to a value from zero (0) to one hundred (100).

Figure 12A:
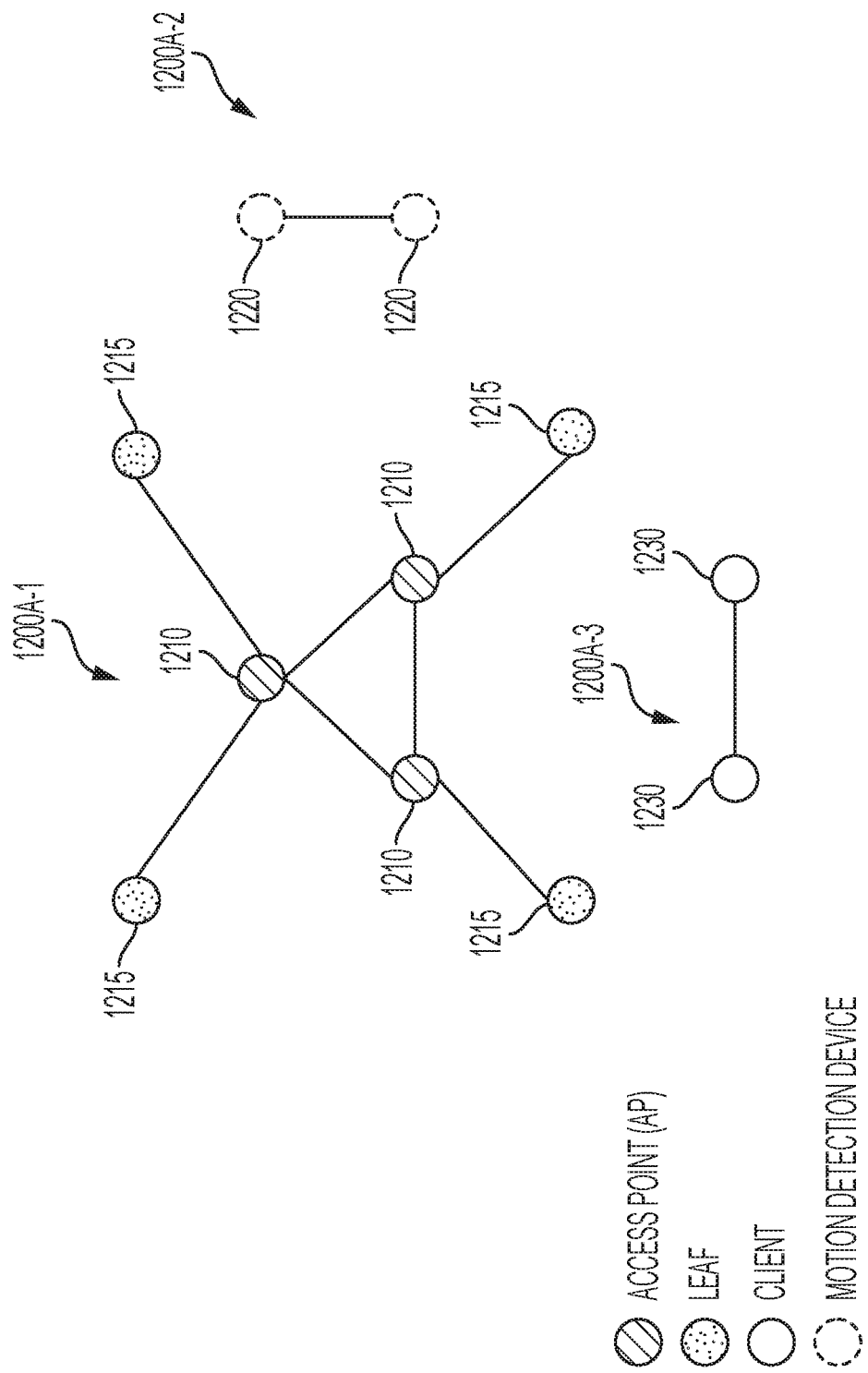
FIGS. 12A-12C illustrate system architecture examples of a motion detection system.
Figure 12B:
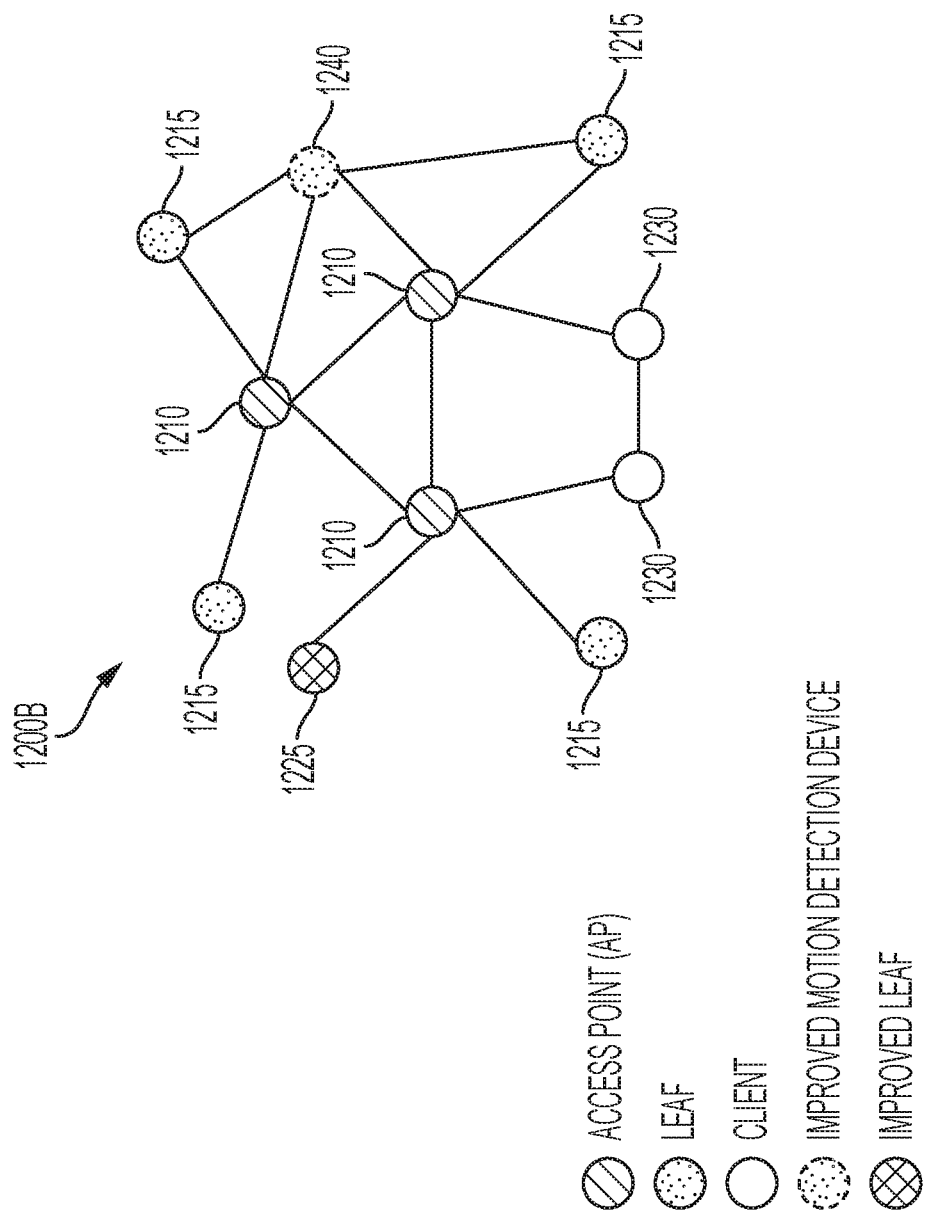
Figure 12C:
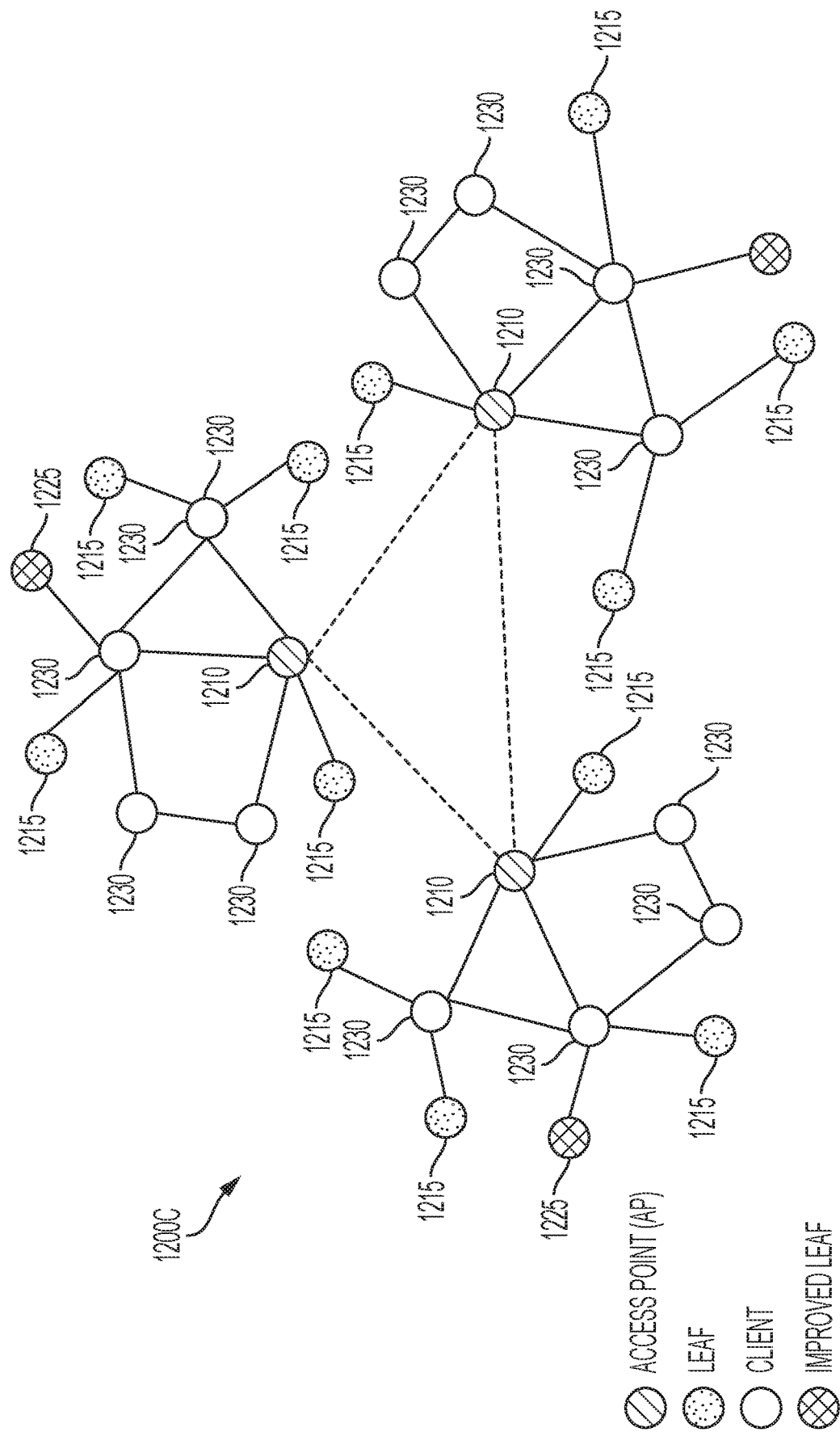

FIGS. 12A, 12B, and 12C illustrate system architecture examples of a motion detection system. These system architecture examples describe and, in some cases, expand the types of connectivity supported between nodes that form a motion detection system, such as the systems shown in FIGS. 1, 3A, and 3B, for example. In the example system architecture 1200A shown in FIG. 12A, the different types of nodes are limited in the ways they may be connected in a motion detection system. For example, the node connectivity is mostly homogenous in that like devices are connected to like devices to form a motion detection system. In each of the example configurations in FIG. 12A, motion may be detected between each pair of connected nodes, including through walls. Each motion detection system configuration described in FIG. 12A can provide motion detection coverage of a large area. The motion detection system configurations in FIG. 12A may also be able to determine the proximity of the motion to a particular node. The motion detection system configurations in FIG. 12A may also limit false detections of motion in the coverage area. In example configuration 1200A-1, the motion detection system may be comprised of access points (APs) 1210 (e.g. WAP 302 in FIG. 3A) and leaf nodes 1215 (e.g. devices 304 in FIG. 3A). The APs 1210, for example, may form a mesh network in which each of the APs 1210 are connected to at least one other AP. A mesh network may be composed of two or more devices, e.g. APs 1210 (e.g. WAPs 302A, 302B, 302C in FIG. 3B). Leaf nodes 1215 may be connected to each of the Aps (e.g. devices 304A, 304B, 30C in FIG. 3B). A leaf node 1215 may be a Wi-Fi device that acts as a sensor device. In one example, a smart phone may be a leaf node (e.g. device 34B in FIG. 3B). In some cases, it is preferable that leaf nodes 1215 of the motion detection system are stationary and have a steady power supply, e.g. the smart phone is plugged in. In some cases, the APs 1210 and the leaf nodes 1215 may conform to the IEEE 802.11ac or higher standard protocol, and do not require motion detection-specific hardware or software to form a motion detection system.

In example configuration 1200A-2, the motion detection system is comprised of at least two motion detection devices 1220 that are configured with motion detection capabilities (e.g. wireless communication devices 102A, 102B, 102C in FIG. 1). The motion detection devices 1220 may be connected to form a mesh network, e.g. of two or more motion detection devices 1220. In some instances, the motion detection devices 1220 may be configured with a motion detection software. The motion detection devices 1220 may comprise dedicated motion detection hardware and/or software. In the example shown, the example motion detection devices 1220 may only connect to other motion detection devices similarly configured.

In example configuration 1200A-3, the motion detection system may comprise two client devices 1230 forming a client-to-client connection. The client devices 1230 may be Wi-Fi enabled devices, e.g. devices 304 in FIG. 3B may be Wi-Fi cameras, or other Wi-Fi devices, that are configured with motion detection software. In some cases, the configuration of client devices 1230 provides a point-to-point motion sensor. In an example, the client devices 1230 may interact with each other to determine motion occurring between the devices.

FIG. 12B illustrates another system architecture 1200B that has less restrictive connectivity of different types of nodes in a motion detection system. For example, each of the different types of nodes may be able to connect to the APs 1210, which are configured in a mesh network (e.g. WAPs 302A, 302B, 302C in FIG. 3B). In this example, the leaf nodes 1215, for example, devices conforming to 802.11ac or higher, or devices that can provide beamforming information (such as, H-matrix and/or V-matrix), and also improved leaf nodes 1225, for example, any 802.11 devices that either provide H-matrix and/or V-matrix, and/or a compressed V-matrix, may connect to any of the APs 1210 (e.g. devices 304A, 304B, 304C in FIG. 3B). Client devices 1230 may be connected to the APs 1210, in addition to each other, e.g. the configuration may comprise an AP mesh network including nodes 1210 (e.g. the network of devices 302A, 302B, 302C shown in FIG. 3B) and a client mesh network including any of the leaf nodes 1215, 1225 or client nodes 1230 (e.g. devices 304A, 304B, 304C). Further, improved motion detection devices 1240 may be configured with motion detection hardware, e.g. dedicated hardware, but may additionally support connectivity to APs 1210. This type of configuration utilizing additional nodes, and therefore, additional data for detecting motion, in the motion detection system as illustrated in FIG. 12B provides improved data collection and thus, improved features, such as, occupancy detection (e.g. whether a person or object is present), localization of motion based on unsupervised machine learning (determining where motion is occurring without human input/assistance), and enhanced motion type detection (e.g. is a human/dog/cat/etc moving).

FIG. 12C illustrates another system architecture 1200C in which the different types of devices may connect to any other device. For example, leaf devices 1215, 1225 may connect to client devices 1230 (e.g. devices 304A, 304B, 304C may each connect to each other in this example), which connections were not supported in the configuration illustrated FIG. 12B. Further, this configuration does not include, or require, any motion detection devices 1220, 1240, e.g. devices that are specifically configured with dedicated motion detection hardware and/or software. In some cases, the hardware components in the motion detection system in FIG. 12C may be comprised of commercially available devices, e.g. leafs 1215, 1225, clients 1230, and APs 1210 (which may include devices 304 and WAPs 302 shown in FIG. 3B). Therefore, this configuration facilitates having significantly more nodes contributing data to the motion detection system. In this example, the configuration may form a large multi-standard network (e.g. having greater than 10 nodes). Further, each device-to-device connection (e.g. connections between leafs 1215, 1225 and clients 1230) may constitute a motion link, where motion measurements may be taken. In this example, there may be hundreds of motion links providing motion data thereby increasing the amount of data collected by the system. As a result, motion detection analytics are improved because more data is available to analyze and to develop more specific contexts for the data. For example, a motion detection system with the configuration of FIG. 12C may collect enough data to be able to provide unsupervised multi-target localization and target count (e.g. track multiple movements and objects), provide statistical target identification (e.g. based on labeling a movement that is statistically the same overtime, such as, a slow moving person compared to a fast moving person, or an electric fan), and reliably detect respiratory activity (e.g. when a person or animal is stationary).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of some of the examples described, motion is detected based on beamforming matrices.

In a first example, beamforming dynamic information is obtained based on a set of wireless signals transmitted through a space from a first wireless communication device to a second wireless communication device. Motion of an object in the space is detected based the beamforming dynamic information.

Implementations of the first example may, in some cases, include one or more of the following features. Motion is detected by analyzing changes over time in the beamforming dynamic information. Spatial maps are generated based on the beamforming dynamic information for each respective wireless signal, and changes in the spatial maps over time are analyzed to detect motion. Spatial maps represent relative intensity of received wireless signals as a function of direction. Detecting a location of the object in the space based on the beamforming dynamic information.

The beamforming dynamic information includes feedback matrices for each respective wireless signal in the set of wireless signals, each feedback matrix generated by the second wireless communication device. The beamforming dynamic information includes steering matrices associated with each respective wireless signal in the set of wireless signals, each steering matrix generated by the first wireless communication device based on feedback received from the second wireless communication device. The feedback matrix is generated by the second wireless device in response to a channel sounding process executed with the first wireless device. The feedback matrix is one of an H-matrix, a V-matrix, or a compressed V-matrix. The first device is a beamformer having a plurality of transmit antennas and the second device having a plurality of receive antennas in a multiple-input multiple-output (MIMO) system, the spatial maps are associated with respective modes, and the modes correspond to communication between respective pairs of the transmit antennas and receive antennas.

In a second example, a second wireless communication device receives a wireless signal transmitted through a space from a first wireless device. A feedback matrix is generated based on the wireless signal. The feedback matrix is used to detect motion in the space, or the feedback matrix is transmitted to the first wireless communication device for use in detecting motion in the space.

Implementations of the second example may, in some cases, include one or more of the following features. The first wireless communication device is a central controller and the second wireless communication device is an observation device. The first wireless communication device and the second wireless communication device comprise an ad-hoc motion sensing network. The wireless signal is a wireless standard protocol message, and the second wireless communication device sends the feedback matrix to the first wireless communication device in a corresponding wireless standard protocol response. The wireless standard protocol message comprises data traffic. The wireless signal includes a broadcast signal. The feedback matrix is an H-matrix, a V-matrix, or a compressed V-matrix. The first wireless communication device and the second wireless communication communicate in a mesh network. The wireless signal comprises a wireless standard protocol message generated by the first wireless communication device according to a wireless communication standard. The wireless standard protocol message includes a ping addressed to the second wireless communication device. The wireless standard protocol message comprises a ping to a plurality of neighbor devices including the second wireless communication device. The wireless standard protocol message comprises data traffic. Using the feedback matrix to detect a location of the object in the space. Determining to use the feedback matrix to detect motion by operation of motion detection software on the second wireless communication device based on identifying that the second wireless communication device comprises the motion detection software. Determining to transmit the feedback matrix to the first wireless communication device for motion detection based on identifying that the second wireless communication device does not comprise motion detection software.

In a third example, a wireless communication device transmits a wireless standard protocol message through a space to one or more neighbor devices. A corresponding wireless standard protocol response is received that includes beamforming information feedback in response to the wireless standard protocol message from each of the one or more neighbor devices. Motion of an object is detected in the space based on the beamforming information feedback from each of the neighbor devices.

Implementations of the third example may, in some cases, include one or more of the following features. The wireless standard protocol message is generated by the wireless communication device according to a wireless communication standard, and the wireless standard protocol response is generated according to the wireless communication standard. The beamforming information feedback includes an H matrix, a compressed H matrix, or a V matrix. The wireless communication device and one or more neighbor devices form a star, mesh, or an ad-hoc motion sensing network. The wireless standard protocol message includes an explicit beamforming request, an implicit beamforming request, a PROBE request, or a ping. The wireless standard protocol message further includes data traffic. The wireless communication device computes motion indicator values from the beamforming information. The wireless standard protocol is IEEE 802.11. The wireless standard protocol is a mesh network standard. The wireless standard protocol message includes a ping addressed to a particular neighbor device. The wireless standard protocol message includes a ping broadcast to a plurality of neighbor devices. The wireless standard protocol message includes data traffic. The beamforming information feedback matrix is an H-matrix, a V-matrix, or a compressed V-matrix. The wireless communication device and one or more neighbor devices form an ad-hoc motion sensing network. Using the beamforming information feedback to detect a location of the object in the space.

In some implementations, a computer-readable medium stores instructions that are operable when executed by a data processing apparatus to perform one or more operations of the first and second examples. In some implementations, a system (e.g., a wireless communication device, computer system, a combination thereof, or other type of system communicatively coupled to the wireless communication device) includes one or more data processing apparatuses and memory storing instructions that are operable when executed by the data processing apparatus to perform one or more operations of the first and second examples.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:
1. A motion detection method, comprising:
transmitting, by a wireless communication device, a wireless standard protocol message through a space to one or more neighbor devices;
receiving a corresponding wireless standard protocol response comprising beamforming information feed- back in response to the wireless standard protocol message from each of the one or more neighbor devices; and detecting motion of an object in the space based on the beamforming information feedback from each of the neighbor devices;

wherein detecting motion of the object comprises:
generating spatial maps based on the dynamic beamforming information, and
analyzing changes in the spatial maps over time.

2. The method of claim 1, wherein the wireless standard protocol message is generated by the wireless communication device according to a wireless communication standard, and the wireless standard protocol response is generated according to the wireless communication standard.

3. The method of claim 2, wherein the wireless communication standard comprises an IEEE 802.11 standard.

4. The method of claim 2, wherein the wireless communication standard comprises a mesh network standard.

5. The method of claim 1, wherein the wireless standard protocol message comprises a ping addressed to a particular neighbor device.

6. The method of claim 1, wherein the wireless standard protocol message comprises a ping broadcast to a plurality of neighbor devices.

7. The method of claim 1, wherein the wireless standard protocol message comprises data traffic.

8. The method of claim 1, wherein the beamforming information feedback comprises at least one of:
an H-matrix;
a V-matrix; or
a compressed V-matrix.

9. The method of claim 1, wherein the wireless communication device and one or more neighbor devices form an ad-hoc motion sensing network.

10. The method of claim 1, using the beamforming information feedback to detect a location of the object in the space.

11. A wireless communication device comprising:
a processor; and
a memory comprising instructions which, when executed by the processor, cause the wireless communication device to perform operations comprising:
transmitting a wireless standard protocol message through a space to one or more neighbor devices;
receiving a corresponding wireless standard protocol response comprising beamforming information feedback in response to the wireless standard protocol message from each of the one or more neighbor devices; and
detecting motion of an object in the space based on the beamforming information feedback from each of the neighbor devices;
wherein detecting motion of the object comprises:
generating spatial maps based on the dynamic beamforming information, and analyzing changes in the spatial maps over time.

12. The device of claim 11, wherein the wireless standard protocol message is generated by the wireless communication device according to a wireless communication standard, and the wireless standard protocol response is generated according to the wireless communication standard.

13. The device of claim 12, wherein the wireless communication standard comprises an IEEE 802.11 standard.

14. The device of claim 12, wherein the wireless communication standard comprises a mesh network standard.

15. The device of claim 11, wherein the wireless standard protocol message comprises a ping addressed to a particular neighbor device.

16. The device of claim 11, wherein the wireless standard protocol message comprises a ping broadcast to a plurality of neighbor devices.

17. The device of claim 11, wherein the wireless standard protocol message comprises data traffic.

18. The device of claim 11, wherein the beamforming information feedback comprises at least one of:
an H-matrix;
a V-matrix; or
a compressed V-matrix.

19. The device of claim 11, wherein the wireless communication device and one or more neighbor devices form an ad-hoc motion sensing network.

20. The device of claim 11, using the beamforming information feedback to detect a location of the object in the space.

21. A non-transitory computer-readable medium comprising instructions that, when executed by data processing apparatus, perform operation comprising:
transmitting, by a wireless communication device, a wireless standard protocol message through a space to one or more neighbor devices;
receiving a corresponding wireless standard protocol response comprising beamforming information feedback in response to the wireless standard protocol message from each of the one or more neighbor devices; and
detecting motion of an object in the space based on the beamforming information feedback from each of the neighbor devices;
wherein detecting motion of the object comprises:
generating spatial maps based on the dynamic beamforming information, and analyzing changes in the spatial maps over time.

22. The computer-readable medium of claim 21, wherein the wireless standard protocol message is generated by the wireless communication device according to a wireless communication standard, and the wireless standard protocol response is generated according to the wireless communication standard.

23. The computer-readable medium of claim 22, wherein the wireless communication standard comprises an IEEE 802.11 standard.

24. The computer-readable medium of claim 21, wherein the wireless standard protocol message comprises a ping addressed to a particular neighbor device.

25. The computer-readable medium of claim 21, wherein the wireless standard protocol message comprises a ping broadcast to a plurality of neighbor devices.

26. The computer-readable medium of claim 21, wherein the wireless standard protocol message comprises data traffic.

27. The computer-readable medium of claim 21, wherein the beamforming information feedback comprises at least one of:
an H-matrix;
a V-matrix; or
a compressed V-matrix.

28. The computer-readable medium of claim 21, wherein the wireless communication device and one or more neighbor devices form an ad-hoc motion sensing network.

29. The computer-readable medium of claim 21, the operations comprising using the beamforming information feedback to detect a location of the object in the space.

\* \* \* \* \*

UNITED STATES PATENT AND TRADEMARK OFFICE
CERTIFICATE OF CORRECTION

PATENT NO. : 10,605,908 B2  
APPLICATION NO. : 16/184729  
DATED : March 31, 2020  
INVENTOR(S) : Kravets et al.

Page 1 of 1

It is certified that error appears in the above-identified patent and that said Letters Patent is hereby corrected as shown below:

In the Drawings

Sheet 6/20, Fig. 4A, delete "Tx1" and insert -- $T_{x1}$ -- therefor.

Sheet 6/20, Fig. 4A, delete "Tx2" and insert -- $T_{x2}$ -- therefor.

Sheet 6/20, Fig. 4A, delete "Rx1" and insert -- $R_{x1}$ -- therefor.

Sheet 6/20, Fig. 4A, delete "Rx2" and insert -- $R_{x2}$ -- therefor.

Sheet 7/20, Fig. 4B, delete "Rx1" and insert -- $R_{x1}$ -- therefor.

Sheet 7/20, Fig. 4B, delete "Rx2" and insert -- $R_{x2}$ -- therefor.

In the Specification

Column 2, Line 49, delete "in in" and insert -- in -- therefor.

Column 10, Line 8, delete "220" and insert -- 210 -- therefor.

Column 19, Line 15, delete "30C" and insert -- 304C -- therefor.

Column 19, Line 18, delete "34B" and insert -- 304B -- therefor.

In the Claims

Column 25, Line 37, Claim 10, after "claim 1," insert -- comprising --.

Column 26, Line 18, Claim 20, after "claim 11," insert -- the operations comprising --.

Signed and Sealed this  
Second Day of June, 2020

Andrei Iancu  
*Director of the United States Patent and Trademark Office*